(12) United States Patent
Omi et al.

(10) Patent No.: US 6,850,489 B1
(45) Date of Patent: Feb. 1, 2005

(54) COMMUNICATION SYSTEM TO WHICH MULTIPLE ACCESS CONTROL METHOD IS APPLIED

(75) Inventors: Shinichiro Omi, Toyono (JP); Kazuhiro Ando, Katano (JP); Hiroyuki Imai, Takarazuka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/559,391

(22) Filed: Apr. 26, 2000

(30) Foreign Application Priority Data

Apr. 28, 1999 (JP) ............................................ 11-122544

(51) Int. Cl.[7] .............................. H04J 3/16; H04B 7/208; H04L 12/56
(52) U.S. Cl. .................. 370/230; 370/348; 370/395.21; 370/395.41
(58) Field of Search ................................ 370/328, 348, 370/437, 441, 442, 443, 445, 458, 255, 236, 236.1, 235, 252, 236.2, 395.21, 395.41, 395.2, 338

(56) References Cited

U.S. PATENT DOCUMENTS

| | | | | |
|---|---|---|---|---|
| 5,231,634 A | * | 7/1993 | Giles et al. .................. | 370/348 |
| 5,504,744 A | * | 4/1996 | Adams et al. ............... | 370/232 |
| 5,598,417 A | * | 1/1997 | Crisler et al. ............... | 370/348 |
| 5,737,312 A | * | 4/1998 | Sasagawa .................... | 370/232 |
| 5,790,551 A | * | 8/1998 | Chan ........................... | 370/458 |
| 6,353,616 B1 | * | 3/2002 | Elwalid et al. .............. | 370/443 |
| 2002/0057694 A1 | * | 5/2002 | Kamo ........................ | 370/395.2 |

FOREIGN PATENT DOCUMENTS

JP        8-56381       8/1994

OTHER PUBLICATIONS

"Packet Switching in Radio Channels: Part III—Polling and (Dynamic) Split–Channel Reservation Multiple Access", IEEE Transactions on Communications, vol. Com–24, No. 8, Aug. 1976, pp. 832–845.

* cited by examiner

*Primary Examiner*—Hassan Kizou
*Assistant Examiner*—Gregory Sefcheck
(74) *Attorney, Agent, or Firm*—Wenderoth, Lind, Ponack, L.L.P.

(57) ABSTRACT

A communication system CS includes a plurality of communication stations and data communication is performed between any two communication stations, one is a transmitting station and the other is a receiving station. When any data for transmission is generated, the transmitting station transmits, to the receiving station, a reservation request packet for requesting bandwidth reservation. The receiving station reserves a bandwidth responding to the reservation request packet and then transmits a communication reservation packet to inform the transmitting station of the reserved bandwidth. The transmitting station creates a data packet and then transmits the created data packet through the informed bandwidth. The receiving station stores a valid period of the bandwidth reserved for the transmitting station, and voluntarily and repeatedly creates, for transmission, the communication reservation packet for the duration of the stored valid period. Accordingly, a communication system in which time for bandwidth reservation is shortened and thus bandwidths are effectively utilized is implemented.

13 Claims, 16 Drawing Sheets

Fig. 11

(a)
STORAGE DEVICE

| IDENTIFIER ID OF TRANSMITTING STATION $1_T$ | TRANSFER RATE R | VALID PERIOD VP | TRANSMISSION FREQUENCY TF |
|---|---|---|---|
| $ID_1$(ANY ONE OF "a", "b",...) | $R_1$ | $VP_1$ | |
| | | | |
| ≈ ≈ | ≈ | ≈ | ≈ |
| | | | |

$-13_R$ (b)
STORAGE DEVICE

| IDENTIFIER ID OF TRANSMITTING STATION $1_T$ | TRANSFER RATE R | VALID PERIOD VP | TRANSMISSION FREQUENCY TF |
|---|---|---|---|
| $ID_1$(ANY ONE OF "a", "b",...) | $R_1$ | $VP_1$ | |
| ≈ ⋮ ≈ | ⋮ ≈ | ⋮ ≈ | ≈ |
| $ID_i$(ANY ONE OF "a", "b",...) | $R_i$ | $VP_i$ | |
| | | | |

$-13_R$ (c)
STORAGE DEVICE

| IDENTIFIER ID OF TRANSMITTING STATION $1_T$ | TRANSFER RATE R | VALID PERIOD VP | TRANSMISSION FREQUENCY TF |
|---|---|---|---|
| $ID_1$(ANY ONE OF "a", "b",...) | $R_1$ | $VP_1$ | $TF_1$ |
| ≈ ⋮ ≈ | ⋮ ≈ | ⋮ ≈ | ⋮ ≈ |
| $ID_i$(ANY ONE OF "a", "b",...) | $R_i$ | $VP_i$ | $TF_i$ |
| | | | |

$-13_R$

COMMUNICATION SYSTEM TO WHICH MULTIPLE ACCESS CONTROL METHOD IS APPLIED

BACKGROUND OF THE INVENTION

1. Field of the Invention

The present invention relates to communication systems, and more particularly to a communication system in which a transmitting station and a receiving station are communicably connected through a transmission path, and the receiving station reserves a bandwidth, which is used in data communication, for the transmitting station in advance.

2. Description of the Background Art

Conventionally, a multiple access method has been applied to some communication systems. As an example thereof, "Splid-channel Reservation Multiple Access" (IEEE Trans. Commun., vol. COM-24, pp. 832 to 845, August 1976) is described next below by referring to FIG. 16. The communication system shown in FIG. 16 includes a central station 121, which controls bandwidths for communication, and secondary stations 122 and 123. Hereinafter, a description is made for a case where the secondary stations 122 and 123 transmit data to the central station 121.

For data transmission, the secondary stations 122 and 123 first transmit request packets 124 and 125 to the central station 121 using a reserved channel. After receiving the request packets 124 and 125, the central station 121 schedules timing for data packet transmission so as to reserve bandwidths for the secondary stations 122 and 123. And then, the central station 121 creates a response packet 126 for transmission to a channel for response.

The secondary stations 122 and 123 respectively receive and analyze the response packet 126 to find which bandwidths are each assigned thereto. Through the assigned bandwidths, the secondary stations 122 and 123 respectively transmit data packets 127 and 128 created in accordance with data.

In such SRMA (Splid-channel Reservation Multiple Access), it is necessary to reserve the bandwidth for every data packet in advance to transfer the same. In other words, data packet transmission always follows bandwidth reservation.

For bandwidth reservation, the request packets 124 and 125 and the response packet 126 are transmitted and received. The time requisite for transmission and reception thereof results in heavy overhead and bandwidth usage to a considerable degree.

Further, the stations 122 and 123 are allowed to freely send out the request packets 124 and 125 to any channel for reservation. Accordingly, the request packets 124 and 125 may come into communication collision with each other if being transmitted with the same timing.

If this is the case, the central station 121 cannot correctly receive the collided request packets 124 and 125, and thus cannot create the response packet 126 for transmission. Therefor, the stations 122 and 123 are required to transmit the once-transmitted request packets again, thereby rendering the data communication delayed.

SUMMARY OF THE INVENTION

Therefore, an object of the present invention is to implement a communication system in which bandwidths are effectively utilized by reducing time for bandwidth reservation.

Another object of the present invention is to implement a communication system in which time between generating and transmitting data is shortened.

A first aspect of the present invention is directed to a communication system in which a transmitting station and a receiving station are communicably connected through a transmission path, and the receiving station reserves a bandwidth used in data communication for the transmitting station in advance, wherein the transmitting station transmits a reservation request packet for bandwidth reservation to the receiving station when data to be transmitted is generated, the receiving station reserves the bandwidth in response to the reservation request packet from the transmitting station, and transmits a communication reservation packet for informing the transmitting station of the reserved bandwidth, the transmitting station creates a data packet according to the generated data, and transmits the created data packet through the bandwidth informed by the communication reservation packet from the receiving station, and the receiving station stores a valid period of the bandwidth reserved for the transmitting station, and voluntarily and repeatedly transmits the communication reservation packet to the transmitting station during the stored valid period.

In the conventional SRMA, a request packet corresponding to the reservation request packet and a response packet corresponding to the communication reservation packet are always exchanged immediately before data communication.

However, in the first aspect, after receiving one reservation request packet, a receiving station voluntarily and repeatedly transmits the communication reservation packet as long as the valid period is valid. In other words, a transmitting station only needs to transmit the reservation request packet once so that the once-reserved bandwidth assigned therefor is available for the duration of the valid period. In this manner, in the first aspect, the number of transmitting the reservation request packet is decreased, and accordingly the overhead can be reduced. Accordingly, it becomes possible to implement the communication system in which the bandwidths are effectively utilized.

According to a second aspect, in the first aspect, an initial value of the valid period stored for the transmitting station is predetermined, and the receiving station further shortens the stored valid period with given timing, lengthens the stored valid period on reception of the data packet from the transmitting station, deletes the valid period when the valid period is equal to a predetermined reference value, and voluntarily and repeatedly transmits the communication reservation packet to the transmitting station as long as the valid period is stored.

In the second aspect, the receiving station shortens the valid period with a predetermined timing, and lengthens it after receiving the data packet. Accordingly, the more data is transmitted from the transmitting station, the longer the valid period becomes, and vice versa. In this manner, since the bandwidth to be assigned can be changed in volume according to the volume of data transmitted in the transmitting station, and therefore the bandwidths can be effectively utilized in this communication system.

According to a third aspect, in the second aspect, the transmitting station further sets an identifier assigned thereto to the reservation request packet, and the receiving station further stores the identifier set to the reservation request packet transmitted from the transmitting station together with the initial value of the valid period, and when deletes the valid period, deletes the stored identifier together therewith.

In the third aspect, the receiving station registers the identifier and the valid period of the transmitting station as a set. In this manner, even if the communication system includes a plurality of transmitting stations, the transmitting stations can be uniquely identified. Accordingly, the communication system can employ a number of stations.

According to a fourth aspect, in the first aspect, the receiving station further transmits, with given timing, a request inquiry packet for allowing the transmitting station to transmit the reservation request packet, and the transmitting station further transmits the reservation request packet in response to the request inquiry packet transmitted from the receiving station.

In the fourth aspect, the receiving station transmits the request inquiry packet with a given timing. Therefore, the transmitting station can find, with reliability, the right time to transmit the reservation request packet.

According to a fifth aspect, in the fourth aspect, the receiving station further sets, to the request inquiry packet, a probability that the transmitting station can transmit the reservation request packet, and the transmitting station further transmits the reservation request packet according to the probability value included in the request inquiry packet transmitted from the receiving station.

In the fifth aspect, the transmitting station transmits the reservation request packet according to the probability value. To be specific, the lower the probability value becomes, it gets more difficult for the transmitting station to transmit the reserv ation request packet. Accordingly the reservation request packet hardly collides with others on the transmission path. In this manner, time taken before data packet transmission can be shorter than the conventional SRMA.

According to a sixth aspect, in the fifth aspect, when the receiving station detected a communication collision on the transmission path, the probability value set to the request inquiry packet is relatively low.

In the sixth aspect, the probability gets relatively low when any communication collision is detected on the transmission path. Accordingly, it gets more difficult for the transmitting station to transmit the reservation request packet. In this manner, at least after some communication collision is detected, the reservation request packet hardly collides with others on the transmission path.

According to a seventh aspect, in the fifth aspect, when the receiving station correctly receives the reservation request packet from the transmission path, the probability value set to the request inquiry packet is relatively high.

According to an eighth aspect, in the fifth aspect, when no signal arrives the receiving station from the transmission path for a given time period, the probability value set to the request inquiry packet is relatively high.

In a case where the receiving station correctly receives the reservation request packet, or where the receiving station has no incoming signal for a predetermined time, the transmission path is not congested. In such cases, in the seventh and eighth aspects, the probability to be set is relatively high, and it accordingly gets easier for the transmitting station to transmit the reservation request packet.

According to a ninth aspect, in the second aspect, the receiving station further changes a time interval between two communication reservation packets according to the valid period.

According to a tenth aspect, in the first aspect, the receiving station further changes a time interval between two communication reservation packets according to a transfer rate required by the transmitting station.

In the ninth and tenth aspects, a time interval between two communication reservation packets is changed according to the valid period or requiring transfer rate on the transmitting station side. In this manner, transfer rate from the transmitting station to the receiving station is varied, and thus the communication system can be provided with more flexibility.

According to an eleventh aspect, in the first aspect, when no signal arrives the receiving station from the transmission path for a given time period, the receiving station further judges that the communication reservation packet can be transmitted.

According to a twelfth aspect, in the first aspect, the receiving station further judges that the communication reservation packet can be transmitted on reception of the data packet from the transmission path.

According to a thirteenth aspect, in the first aspect, the transmitting station further judges that the reservation request packet can be transmitted on reception of the data packet or the communication reservation packet from the transmission path.

With each timing described in the eleventh to thirteenth aspects, the possibility for the transmission path being congested is low. Accordingly, the data packet or the reservation request packet transmitted from the transmitting station or the receiving station hardly collides with others on the transmission path.

According to a fourteenth aspect, in the first aspect, when no signal arrives the receiving station from the transmission path for a given time period, the transmitting station further judges that the reservation request packet can be transmitted.

According to a fifteenth aspect, in the first aspect, the transmitting station further judges that the data packet can be transmitted on reception of another data packet from the transmission path.

According to a sixteenth aspect, in the first aspect, the transmitting station further measures a lapse of time after transmitted the data packet, and when the lapse of time becomes equal to a reference value relevant to the valid period, judges that the reservation request packet can be transmitted.

In the conventional SRMA, the request packet corresponding to the reservation request packet is transmitt ed via a channel for reservation.

However, in the fourteenth to six teenth aspects, the transmitting station has data for transmission and determines that the reservation request packet can be transmitted with any timing described in these aspects. To be specific, in this communication system, the transmitting station has no more need to wait for a time frame to which the channel for reservation is set. Accordingly, in the transmitting station, time between generating, the data for transmission and transmitting the reservation request packet (i.e., time before data communication) can be shortened.

Further, with each timing described in the fifteenth to seventeenth aspects, the transmission path is not so congested, because packet exchange is over. The reservation request packet being sent out from the transmitting station with such timings, it becomes possible to provide the communication system in which the bandwidths are more ef ectively utilized, a nd the transmitted reservation request packet hardly collides with others on the transmission path.

These and other objects, features, aspects and advantages of the present invention will become more apparent from the

BRIEF DESCRIPTION OF THE DRAWINGS

FIGS. 11a to 11c are diagrams each showing information to be registered in a storage device $13_R$ of the receiving station $1_R$;

DESCRIPTION OF THE PREFERRED EMBODIMENTS

Figure 1:
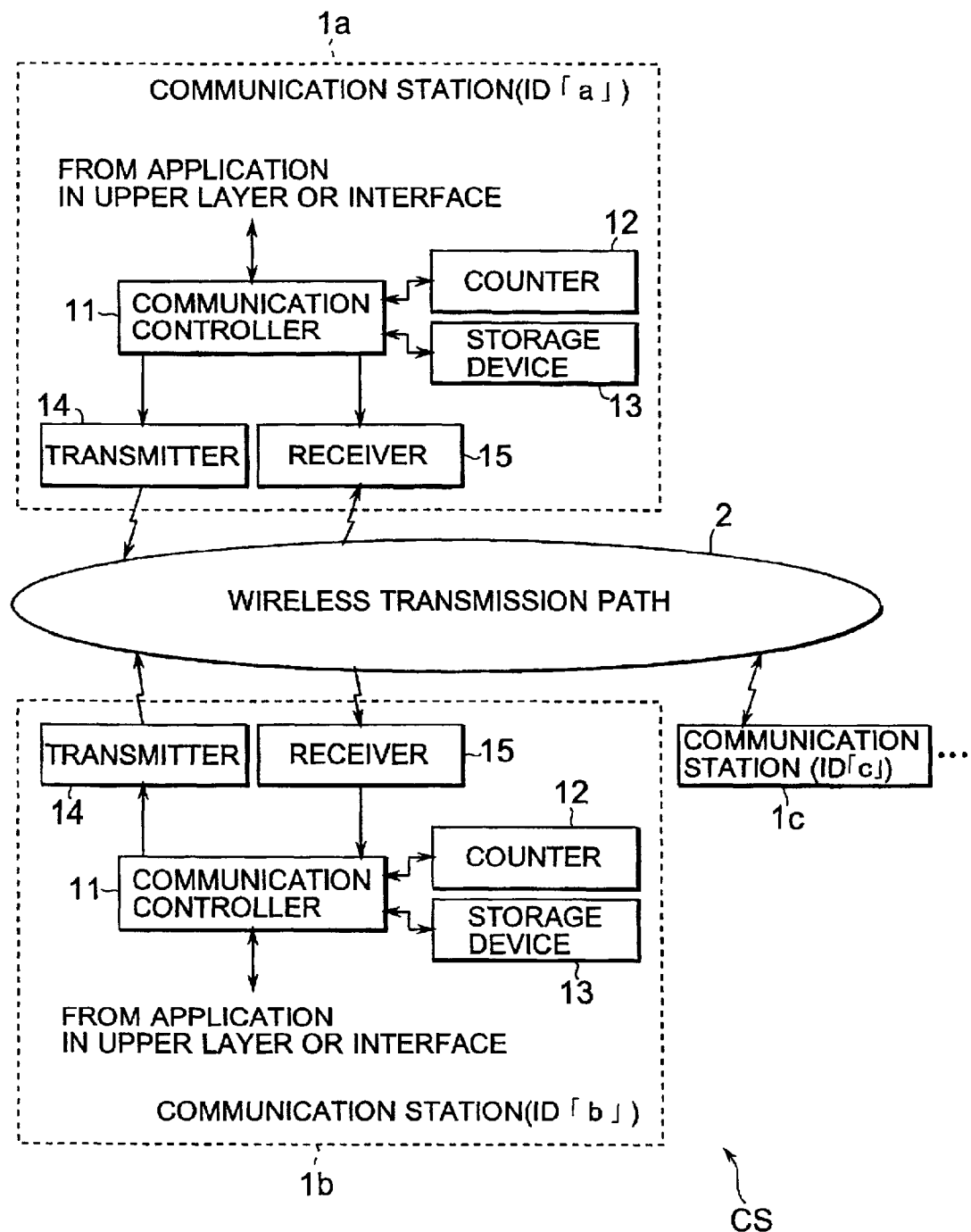
FIG. 1 is a block diagram showing the entire structure of a communication system CS according to an embodiment of the present invention.

FIG. 1 is a block diagram showing the entire structure of a communication system CS according to an embodiment of the present invention. In the communication system CS, a plurality of communication stations 1 (in the drawing, communication stations $1_a$, $1_b$, and $1_c$ are shown) are communicably connected through a wireless transmission path 2.

The communication stations 1 are provided, in advance, with each different identifier ID, thereby being uniquely identified in the communication system CS. In this embodiment, the communication stations $1a$ to $1_c$ are each provided with the identifiers ID"a" to ID"c".

Once such communication system CS is started, data is transmitted between the communication stations 1. Hereinafter, any communication station 1 which transmits the data is referred to as a transmitting station $1_T$, and any other communication station 1 which receives the data is as a receiving station $1_R$. In the communication system CS, the receiving stations $1_R$ reserves bandwidths used in data communication for the transmitting stations $1_T$ in advance. Hereinafter, a communication procedure for bandwidth reservation is referred to as a reservation phase, and a procedure for data communication a data communication phase.

Figure 2:
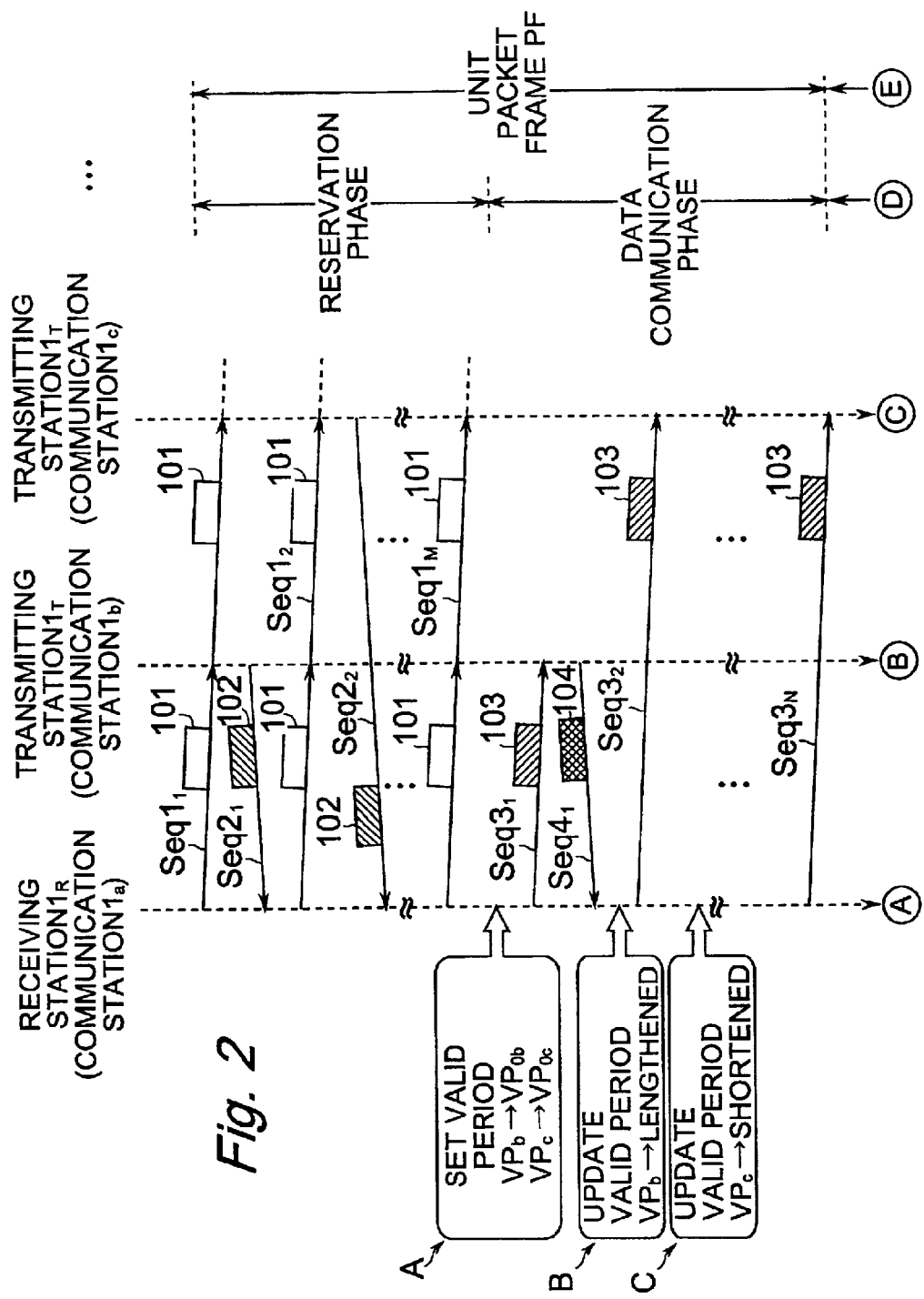
FIG. 2 is a sequence chart roughly illustrating the first half of a communication procedure carried out in the communication system CS in FIG. 1.
Figure 3:
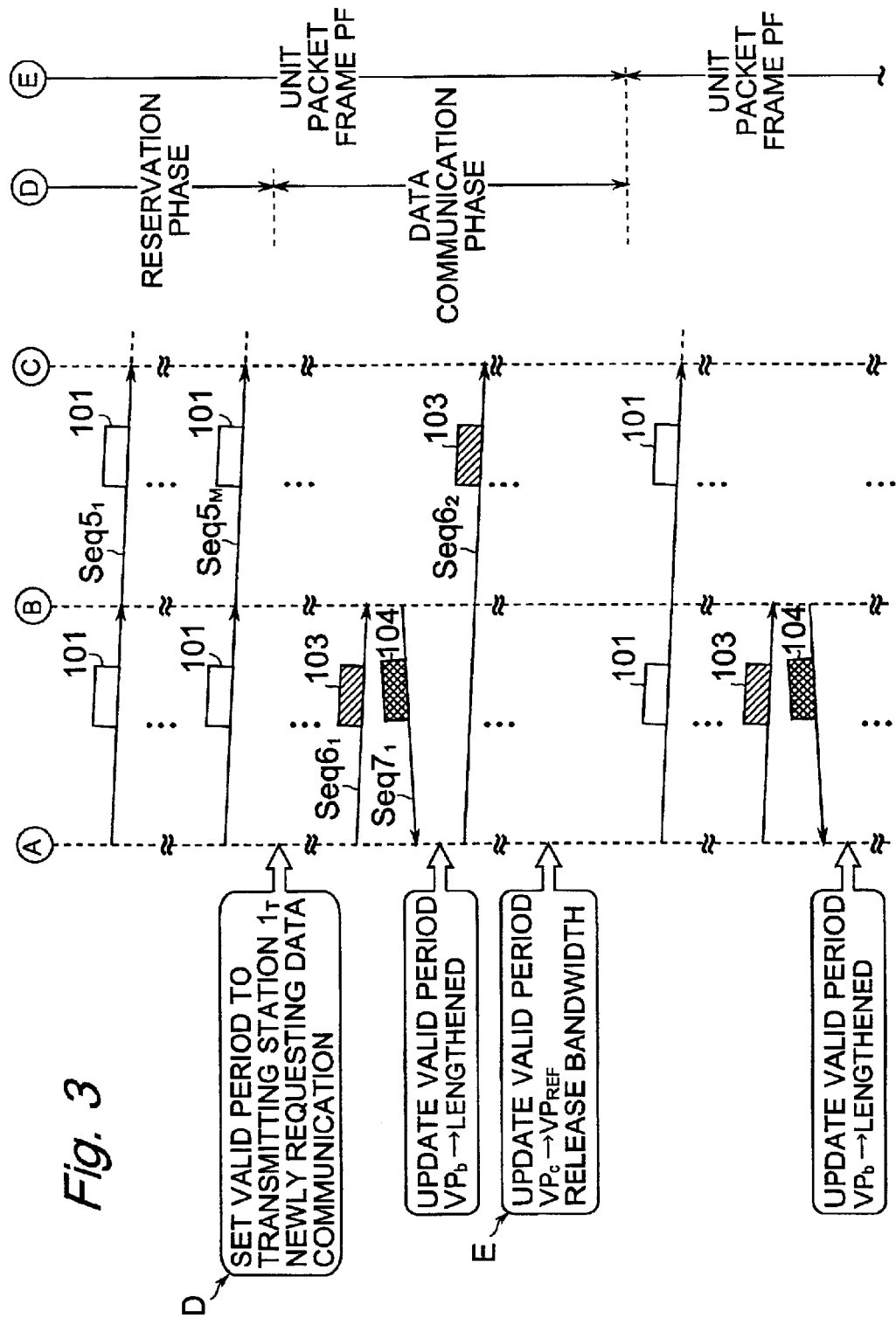
FIG. 3 is a sequence chart roughly illustrating the second half of the communication procedure carried out in the communication system CS in FIG. 1.

A typical example for the communication procedure between the receiving stations $1_R$ and the transmitting stations $1_T$ is described by referring to sequence charts in FIGS. 2 and 3. Herein, it is described a case where the communication station $1_a$ operates as the receiving station $1_R$, and the communication stations $1_b$ and $1_c$ each operate as the transmitting station $1_T$.

Figure 4:
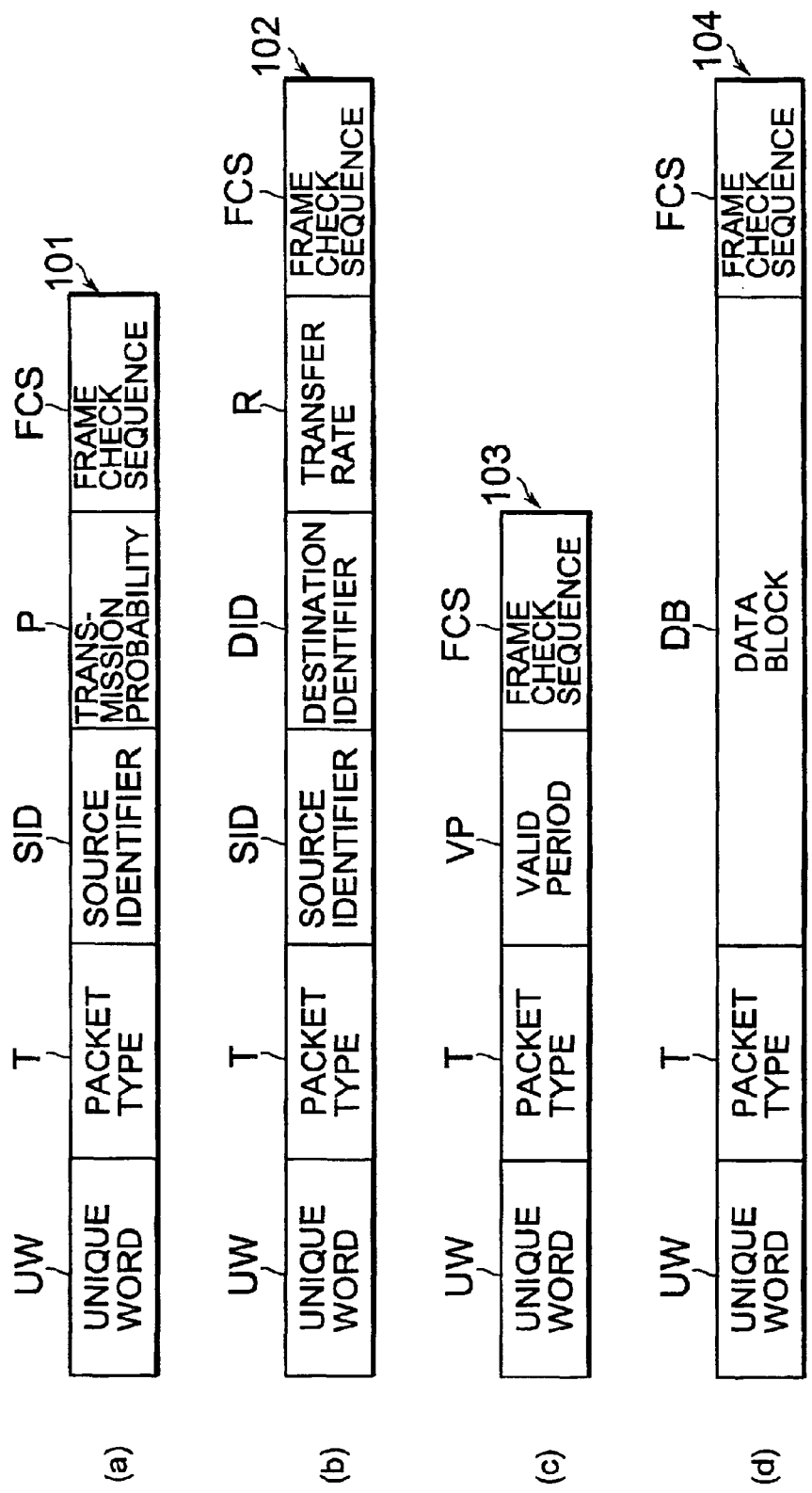
FIGS. 4a to 4d are diagrams each showing a frame format of each packet exchanged in the communication system CS in FIG. 1.

In the reservation phase, the receiving station 1, assembles a request inquiry packet 101 so as to make an inquiry about whether any communication station 1 in the communication system CS (except the receiving station $1_R$) is requesting for data communication. More specifically, the receiving station $1_R$ assembles, as shown in FIG. 4a, the request inquiry packet 101 from a source identifier SID which is the identifier ID assigned thereto, a packet type T, a unique word UW, and a frame check sequence FCS in addition to a transmission probability value P.

The unique word UW is typically the information necessary for the communication stations 1 receiving the request inquiry packet 101 to establish frame synchronization or to identify the bit position of other information subsequent thereto (e.g., packet type T).

The packet type T is the information necessary for the communication stations 1 to identify the received packet as the request inquiry packet 101.

To the source identifier SID, the identifier ID assigned to the receiving station $1_R$ which assembles the request inquiry packet 101 is set.

The transmission probability value P is later described, and is not now described.

The frame check sequence FCS is the code for the communication stations 1 receiving the request inquiry packet 101 to judge whether any errori is occurred in the request inquiry packet 101, or to correct any error occurred therein.

The receiving station $1_R$ sends out such request inquiry packet 101 to the wireless transmission path 2 so as to make an inquiry about whether any other communication station 1 is requesting for data communication (sequence Seq $1_1$).

Among the communication stations 1, any station having data to be transmitted to the receiving station $1_R$ (the transmitting station $1_t$) receives the request inquiry packet 101 through the transmission path 2 for disassembly. The transmitting station $1_T$ then assembles a reservation request packet 102 for requesting data communication with the receiving station $1_R$, and bandwidth reservationnecessary-forthedatacommunication. Inmoredetail, the transmitting station $1_T$ assembles, as shown in FIG. 4b, the reservation request packet 102 from a destination identifier DID, the source identifier SID, the packet type T, the unique word UW, and the frame check sequence FCS in addition to a transfer rate R, which is required for the data communication.

The unique word UW is typically the information necessary for the communication stations 1 receiving the reservation request packet 102 (the receiving station $1_R$) to establish frame synchronization or to identify the location of other information subsequent thereto (e.g., packet type T).

The packet type T is the information for identifying the reservation request packet 102. The packet type T accordingly enables the receiving station $1_R$ to identify the received packet as the reservation request packet 102.

To the source identifier SID, the identifier ID of the transmitting station $1_T$ which assembles the reservation request packet 102 is set.

To the destination identifier DID, the identifier ID of the receiving station $1_R$ which receives the reservation request packet 102 is set.

The transfer rate R is the information indicating the transfer rate necessary for data communication (i.e., bandwidth).

The frame check sequence FCS is the code for the communication stations 1 receiving the reservation request packet 102 to judge whether any error is occurred in the reservation request packet 102, or to correct any error occurred therein.

The communication station $1_b$, which is one of the transmitting stations $1_T$, transmits such reservation request packet 102 to the receiving station $1_R$ through the wireless transmission path 2 for requesting data communication and bandwidth reservation therefor (sequence $Seq2_1$).

The receiving station $1_R$ repeats the assembly and transmission of the request inquiry packet 101 for M times (where M is a variable, and is an integer equal to or more than 0) (sequence $Seq1_1$ to $1_M$) so as to collect requests for data communication from some more transmitting stations $1_T$. In this example, the receiving station $1_R$ presumably assembles and transmits M pieces of request inquiry packets 101 and receives requests for data communication from the communication stations $1_b$ and $1_c$.

After such collection, the receiving station $1_R$ reserves, for each of the requesting transmitting stations $1_T$, a bandwidth necessary for data communication so as to determine how many communication reservation packets 103 are to be transmitted in total N (where N is a variable, and is an integer equal to or more than 0). Herein, the number N is determined in relation to the bandwidths necessitated by the transmitting stations $1_T$ for data communication. Immediately after the startup of the communication system CS, the number N is preferably a value which ensures the transfer rate R required by each transmitting station $1_T$ which transmitted the reservation request packet 102. Note that, since each transmitting station $1_T$ can freely request the requiring transfer rate R to the receiving station $1_R$, the determined number N may be not always ensure the transfer rate R desired by every transmitting station $1_T$. One of the features of the present invention is to generate information referred to as valid period VP for every transmitting station 1, after the receiving station $1_R$ reserved a bandwidth therefor. The valid period VP is the value denoting how long each bandwidth reserved for the transmitting stations $1_T$ is valid, and an initial value thereof is $VP_0$. In this example, valid periods $VP_b$ and $VP_c$ whose initial values are each $VP_{0b}$ and $VP_{0c}$ are presumably generated for the communication stations $1_b$ and $1_c$, respectively (see arrow A in FIG. 2).

After such reservation phase, the data communication phase follows. Therein, the receiving station $1_R$ assembles one communication reservation packet 103 to inform each transmitting station $1_1$ of the bandwidth reserved therefor. To be more specific, the receiving station $1_R$ assembles, as shown in FIG. 4c, the communication reservation packet 103 from the packet type T, the unique word UW, and the frame check sequence FCS in addition to the valid period VP.

Herein, the communication reservation packet 103 does not include the source identifier SID and the destination identifier DID for the purpose of making the packet length shorter. Without being included therewith, the communication reservation packet 103 is correctly received by the targeted transmitting station $1_T$. As to a manner how to assemble the communication reservation packet 103, it is later described in step S63 in FIG. 7 and is not now described.

The unique word UW is typically the information necessary for the communication stations 1 receiving the communication reservation packet 103 (the transmitting stations $1_T$) to identify the location of other information subsequent thereto (e.g., packet type T).

The packet type T is the information for identifying the communication reservation packet 103. The packet type T accordingly enables the transmitting stations 1, to identify the received packet as the communication reservation packet 103.

The communication reservation packet 103 is provided with the valid period VP. Accordingly, the transmitting stations it are each informed of the value of the valid period VP updated on the receiving station $1_R$ side, and can judge the validity thereof.

The frame check sequence FCS is the code for the communication stations 1 receiving the communication reservation packet 103 to judge whether any error is occurred in the communication reservation packet 103, or to correct any error occurred therein.

Such communication reservation packet 103 is sent out to the wireless transmission path 2 by the receiving station $1_R$, and is then received by the targeted transmitting station $1_T$ for disassembly (sequence $Seq3_1$). In this example, the communication reservation packet 103 is presumably transmitted to the transmitting station $1_b$.

The transmitting station $1_T$ divides data for transmission, according to a predetermined size, into several data blocks DB. After receiving the communication reservation packet 103, the transmitting station $1_T$ assembles a data packet 104 so as to transmit one of the data blocks DB to the receiving station $1_R$. In more detail, the transmitting station $1_T$ assembles, as shown in FIG. 4d, the data packet 104 from the packet type T, the unique word UW, and the frame check sequence FCS in addition to the data block DB.

The unique word UW is typically the information necessary for the communication stations 1 receiving the data packet 104 (the receiving station $1_R$) to identify the location of other information subsequent thereto (e.g., packet type T).

The packet type T is the information for identifying the data packet 104, and accordingly enables the receiving station $1_R$ to identify the received packet as the data packet 104.

The frame check sequence FCS is the code for the communication stations 1 receiving the data packet 104 to judge whether any error occurred in the data packet 104, or to correct any error occurred therein.

Herein, the data packet 104 is not provided with the source identifier SID and the destination identifier DID similarly to the communication reservation packet 103. Without being included therewith, the data packet 104 is correctly received by the targeted receiving station $1_R$ As to a manner how to assemble the data packet 104, it is later described in step S143 in FIG. 10 and is not now described.

Such data packet 104 is sent out to the wireless transmission path 2 by the transmitting station $1_T$, and is received by the receiving station $1_R$ for disassembly (sequence Seq$4_1$). In this example, the data packet 104 is presumably sent out by the communication station $1_b$.

The receiving station $1_R$ repeats the transmission of the communication reservation packet 103 for N times (sequence Seq$3_1$ to $3_N$) so as to receive the data packets 104 from the transmitting stations $1_T$ for disassembly. The receiving station $1_R$ then updates, in a manner corresponding to a status for receiving of each data packet 104, the valid period VP each provided to the transmitting stations $1_T$ which transmitted the data packets 104. More specifically, if the receiving station $1_R$ received no data packet 104 from some transmitting station 1, which was supposed to transmit the packet, the valid period provided thereto is shortened. If the receiving station $1_R$ received the data packet 104 from some transmitting station $1_T$, the valid period provided thereto is lengthened.

Assuming that the communication station $1_b$ transmits the data packet 104 to the receiving station 1, in response to the communication reservation packet 103 transmitted thereto in sequence Seq$3_1$ (sequence Seq$4_1$), the receiving station $1_R$ lengthens the valid period VP$_b$ of the communication station $1_b$ (see arrow B in FIG. 2).

It is also assumed that the communication reservation packet 103 is transmitted to the communication station $1_c$ in sequence Seq$3_2$, however, the receiving station $1_R$ does not receive the data packet 104 therefrom for some reasons. If this is the case, the receiving station $1_R$ shortens the valid period VPC of the communication station 1C (see arrow C in FIG. 2).

In such manner, the data communication phase is through. Hereinafter, as shown in FIG. 2, both the reservation phase and the data communication phase are collectively referred to as a unit packet frame PF.

The communication procedure for the receiving station $1_R$ and the transmitting stations $1_T$ after such first unit packet frame PF$_1$ is shown in FIG. 3. In FIG. 3, another reservation phase follows the first data communication phase, and the receiving station $1_R$ determines how many request inquiry packets 101 are to be transmitted in total M. Thereafter, the receiving station $1_R$ repeats the assembly and sending, to the transmission path 2, of the request inquiry packet 101 (sequences Seq$5_1$ to Seq$5_M$) so as to again collect requests for data communication from the transmitting stations $1_T$. Thereafter, the receiving station $1_R$ reserves any bandwidth necessary for data communication for both the transmitting stations $1_T$ which newly transmitted the reservation request packets 102 this time and the transmitting stations $1_T$ to which the valid period VP has been each set so as to determine how many communication reservation packets 103 are to be transmitted in total N. Unlike the case for immediately after the startup of the communication system CS, the number N herein is preferably a value which ensures the transfer rate R required by both the transmitting stations $1_T$ which newly transmitted the reservation request packets 102 this time and the transmitting stations $1_T$ to which the valid period VP has been each set.

Furthermore, the receiving station $1_R$ generates information referred to as valid period VP for the transmitting stations $1_T$ which newly transmitted requests in this reservation phase (see arrow D in FIG. 3).

Hereinafter, in a similar manner to the above, data communication is performed between the receiving station $1_R$ and the transmitting stations $1_T$ by exchanging the communication reservation packets 103 and the data packets 104 therebetween. In the communication system CS, the unit packet frame PF being the combination of the reservation phase and the data communication phase is repeated.

As is described in the foregoing, the valid period VP is lengthened or shortened. Therefore, if a certain transmitting station $1_T$ does not transmit the data packet 104 for some time, the validperiodVP thereof becomes invalid in due time (that means, VP becomes equal to a given reference value VP$_{REF}$). When the valid period VP provided to some transmitting station $1_T$ becomes equal to the reference value VP$_{REF}$, the receiving station $1_R$ releases a bandwidth reserved for the transmitting station $1_T$, and stops assembling the communication reservation packet 103 therefor in the following data communication phase (see arrow E in FIG. 3). In other words, the receiving station $1_R$ voluntarily keeps assembling the communication reservation packet 103 for transmission to the transmitting station $1_T$ until the valid period provided thereto becomes equal to the reference value VP$_{REF}$.

In the example in FIG. 3, the communication station $1_c$ receives the communication reservation packet 103 from the receiving station $1_R$ (see sequence Seq$6_2$) but does not transmit the data packet 104. Therefore, in the course of time, the valid period VP thereof becomes equal to the reference value VP$_{REF}$ (see arrow E), consequently the receiving station $1_R$ stops transmitting the communication reservation packet 103 thereto (see the third packet frame PF, for example).

The typical communication procedure in the communication system CS has been described. Note that, as shown in FIG. 1, each communication station 1 is typically structured by a communication controller $11_R$ a counter 12, a storage device 13, a transmitter 14, and a receiver 15 for implementation of such communication procedure. Note that, forconvenience, FIG. 1 only shows the communication stations 1, and $1_b$ by internal structure thereof.

Hereinafter, for the purpose of structurally distinguishing between the receiving station $1_R$ and the transmitting station $1_T$, each constituent of the receiving station $1_R$ is provided with a small "R" next to the reference numeral thereof. For example, the communication controller 11 provided in the receiving station $1_R$ is denoted by $11_R$. On the other hand, each constituent of the transmitting station $1_T$ is provided with a small "T" next to the reference numeral thereof. For example, the storage device 13 provided in the transmitting station 1, is denoted by $13_T$.

Figure 5:
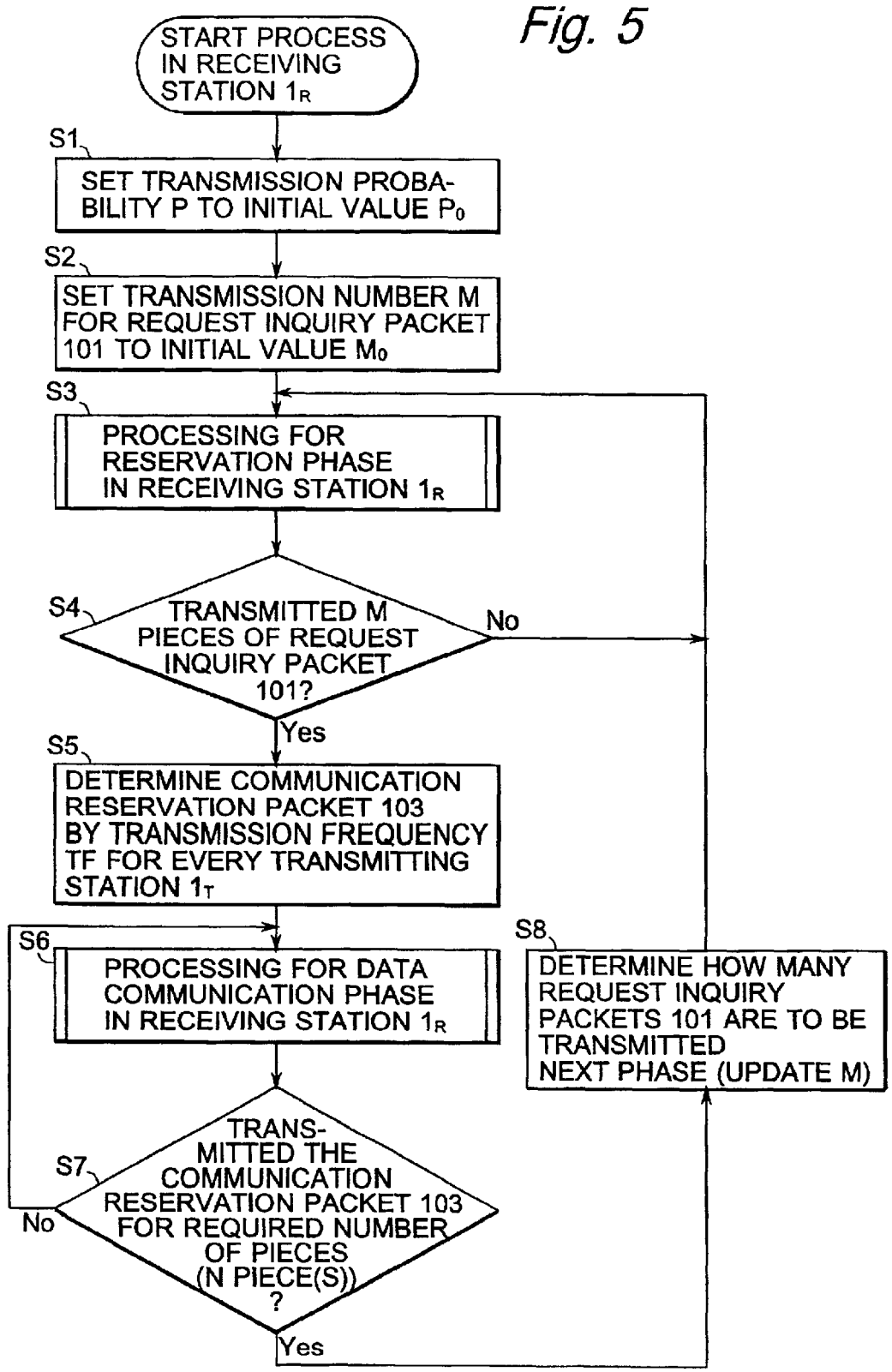
FIG. 5 is a main flowchart illustrating the procedure carried out by a receiving station $1_R$.

First, by referring to FIG. 5, the processing carried out by the receiving station $1_R$ is described in detail. The communication controller $11_R$ sets the transmission probability value P (where P satisfies $0 \leq P \leq 1$) to an initial value P$_0$ (step S1). The initial value P$_0$ is set in accordance with the design specifications of the communication system CS. As to the transmission probability value P, it is later described by referring to steps S134 and S135 in FIG. 9, and is not now described.

Next, the communication controller $11_R$ sets the number M, which indicates how many request inquiry packets 101 are to be transmitted, to an initial value M$_0$ (step S2). The initial value M$_0$ is set in accordance with the design specifications of the communication system CS.

Figure 6:
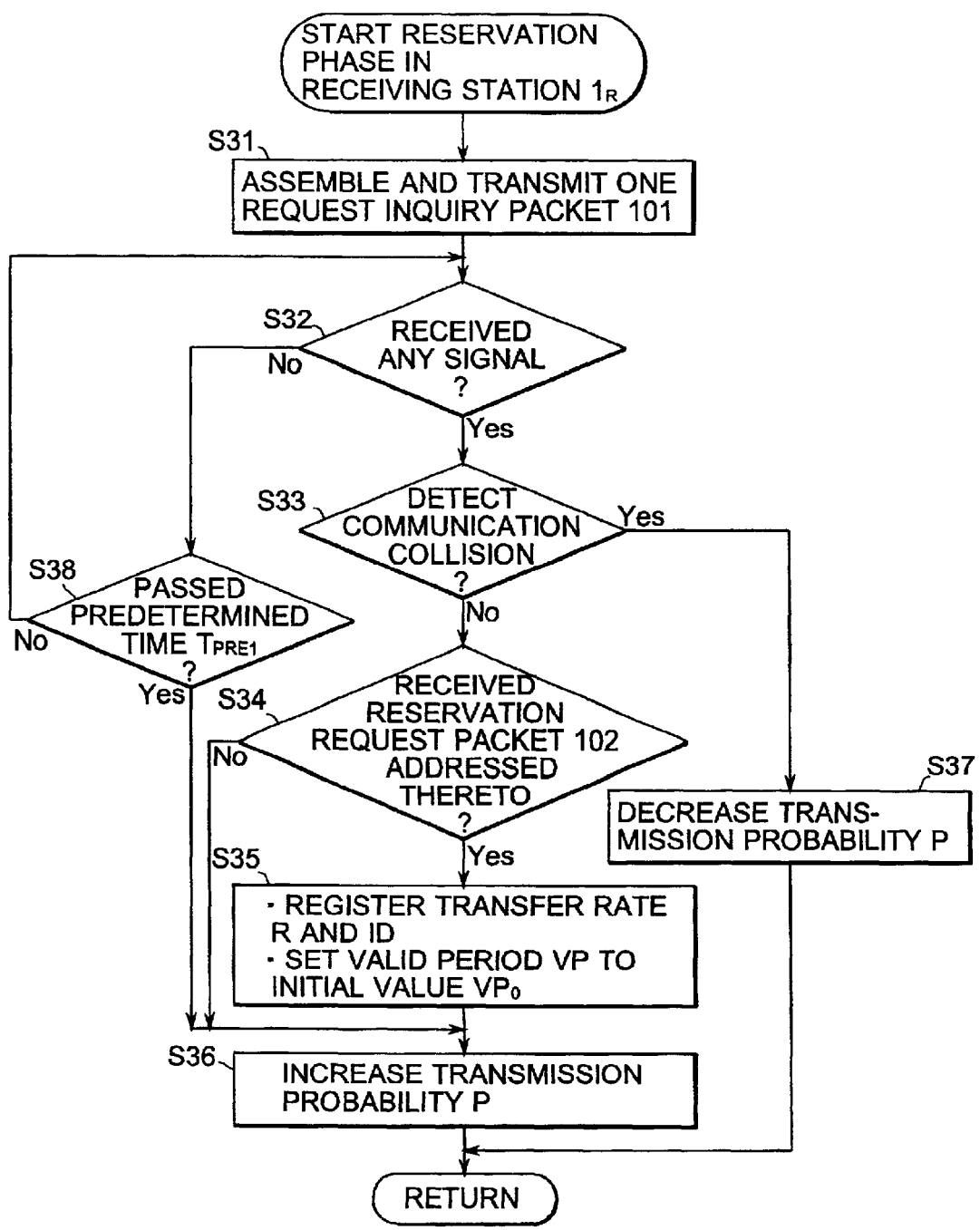
FIG. 6 is a detailed flowchart illustrating the procedure for a reservation phase on the receiving station $1_R$ side.

Thereafter, the communication controller $11_R$ goes to the reservation phase (step S3) FIG. 6 is a detailed flowchart illustrating step S3. In FIG. 6, the communication controller $11_R$ assembles one request inquiry packet 101 from the source identifier SID (that is, the identifier ID assigned to the receiving station $1_R$), the packet type T, the unique word UW, and the frame check sequence FCS in addition to the current transmission probability value P. The request inquiry packet 101 (see FIG. 4a) is sent out to the wireless transmission path 2 via the transmitter $14_R$ (step S31).

Next, the communication controller $11_R$ judges whether any signal (any one of the packets 101 to 104) has arrived from the wireless transmission path 2 via the receiver $15_R$ (step S32). If no signal has arrived, the procedure goes to later-described step S38. If yes, the communication controller $11_R$ judges whether the unique word UW included in the received signal can be detected. This tells whether any communication collision has currently occurred on the wireless transmission path 2 (step S33).

If the unique word UW is defective and thus cannot be detected, the communication controller $11_R$ judges that some communication collision has currently occurred on the wireless transmission path 2, and thus the procedure goes to later-described step S37. If the unique word UW is detected in step S33, the communication controller $11_R$ judges that no communication collision has currently occurred on the wireless transmission path 2. The procedure thus goes to step S34 so that the communication controller $11_R$ disassembles the received packet.

In step S34 (packet disassembly processing), the communication controller $11_R$ judges whether the received signal is the reservation request packet 102 addressed to the receiving station $1_R$. To be more specific, the communication controller $11_R$ extracts the packet type T on the basis of the detected unique word UW. When the packet type T indicates the reservation request packet 102 (see FIG. 4b), the communication controller $11_R$ then extracts the destination identifier DID so as to judge whether the DID is the one provided to the receiving station $1_R$.

When received the reservation request packet 102 addressed to the receiving station $1_R$, the communication controller $11_R$ extracts the transfer rate R and the source identifier SID therefrom. Further, the communication controller $11_R$ generates the valid period VP whose initial value is $VP_0$. The communication controller $11_R$ then registers, as shown in FIG. 11a, the transfer rate R, the identifier SID, and the valid period VP in the storage device $13_R$ as a set (step S35), and the procedure goes to step S36.

In the communication system CS, other communication stations 1 may be also in the middle of data communication at the same time. It means, in step S34, the communication controller $11_R$ may extract wrong identifier ID assigned to those other communication stations 1. Furthermore, even if the communication controller 11R successfully extracts correct identifier ID in step S34, the packet type T may not indicate the reservation request packet 102. If this is the case, the communication controller $11_R$ discards the received signal, and the procedure goes to step S36.

In a case where step S34 is carried out, it means any one of the packets 101 to 104 is correctly received by the communication controller $11_R$. This tells that the wireless transmission path 2 is in a state where a probability of communication collision is relatively low. Therefore, the communication controller $11_R$ adds a given value $\Delta P_1$ (where $\Delta p_1$ satisfies $0<\Delta P_1<1$) to the current transmission probability value P (step S36). In this manner, the transmission probability value P set to another request inquiry packet 101 assembled in the next reservation phase is larger.

Step S33 is referred to again. When the communication controller $11_R$ cannot detect the unique word UW, it tells that the wireless transmission path 2 is in a state where the probability of communication collision is relatively high. If this is the case, the communication controller $11_R$ deducts a given value $\Delta P_2$ (where $\Delta p_2$ satisfies $\Delta P_2<1$, or $\Delta P1=\Delta P2$) from the current transmission probability value P (step S37). In this manner, the transmission probability value P set to another request inquiry packet 101 assembled in the next reservation phase is smaller.

Step S32 is referred to again. When the communication controller $11_R$ could not detect any signal arrived from the wireless transmission path 2, the communication controller $11_R$ judges whether or not a predetermined time $T_{PRE1}$ has elapsed since the request inquiry packet 101 was transmitted (step S38).

The time $T_{PRE1}$ is assumptive that the reservation request packet 102 addressed to the receiving station $1_R$ would have reached there by the time. More specifically, the time $T_{PRE1}$ is a sum of time required for the request inquiry packet 101 to be transferred from the receiving station $1_R$ to the transmitting stations $1_T$, time required for the transmitting stations $1_T$ to send out the reservation request packets 102 to the wireless transmission path 2 after each received the request inquiry packet 101, time required for the reservation request packet 102 to be transferred from the transmitting stations $1_T$ to the receiving station $1_R$, and a time margin.

If the time $T_{PRE1}$ is not passed yet in step S38, the reservation request packet 102 addressed to the receiving station $1_R$ is yet likely to be transmitted. Thus, the procedure returns to step S32 so that the communication controller $11_R$ waits for any signal to be arrived from the wireless transmission path 2.

If the time $T_{PRE1}$ has been passed, the communication controller $11_R$ judges that the reservation request packet 102 addressed to the receiving station $1_R$ is unlikely to be transmitted, and thus the procedure goes to step S36. If this is the case, it also means that no signal has transferred onto the wireless transmission path 2 for the duration of time $T_{PRE1}$, and thus the wireless transmission path 2 is in a state where the probability of communication collision is relatively low. Therefore, the communication controller $11_R$ adds a given value $\Delta P_1$ (where $\Delta P_1$ satisfies $\Delta P_1 \leq 1$) to the current transmission probability value P (step S36).

After step S36 or S37, the communication controller $11_R$ is now through with the reservation phase (step S3) in FIG. 5, and next judges whether M pieces of request inquiry packets 101 have been transmitted (step S4). In step S4 for the first reservation phase, it is judged whether the $M_0$ piece(s) of request inquiry packet 101 is transmitted.

If M pieces of request inquiry packets 101 are not transmitted yet, the communication controller $11_R$ goes to the reservation phase in step S3 again so as to send out a new request inquiry packet 101 to the wireless transmission path 2. If the M pieces of request inquiry packets 101 have been transmitted, the procedure goes to step S5.

By the time the procedure reaches step S5, the communication controller $11_R$ may have received one or more reservation request packets 102 from the transmitting stations $1_T$, and as shown in FIG. 11b, may have registered the transfer rate R, the identifier ID, and the valid period VP in the storage device $13_R$ as a set for every transmitting station 1T The communication controller $11_R$ defines a transmission frequency TF for every registered transmitting station $1_T$ (step S5). More specifically, the transmission frequency TF is a value indicating how many communication reservation packets 103 are to be transmitted for one transmitting station $1_T$ within one unit packet frame PF. Accordingly, the sum of the transmission frequency TF defined for every transmitting station $1_T$ is equal to the number N shown in FIG. 2. The transmission frequency TF for every transmitting station $1_T$ is also registered in the storage device $13_R$ as shown in FIG. 11c.

Figure 7:
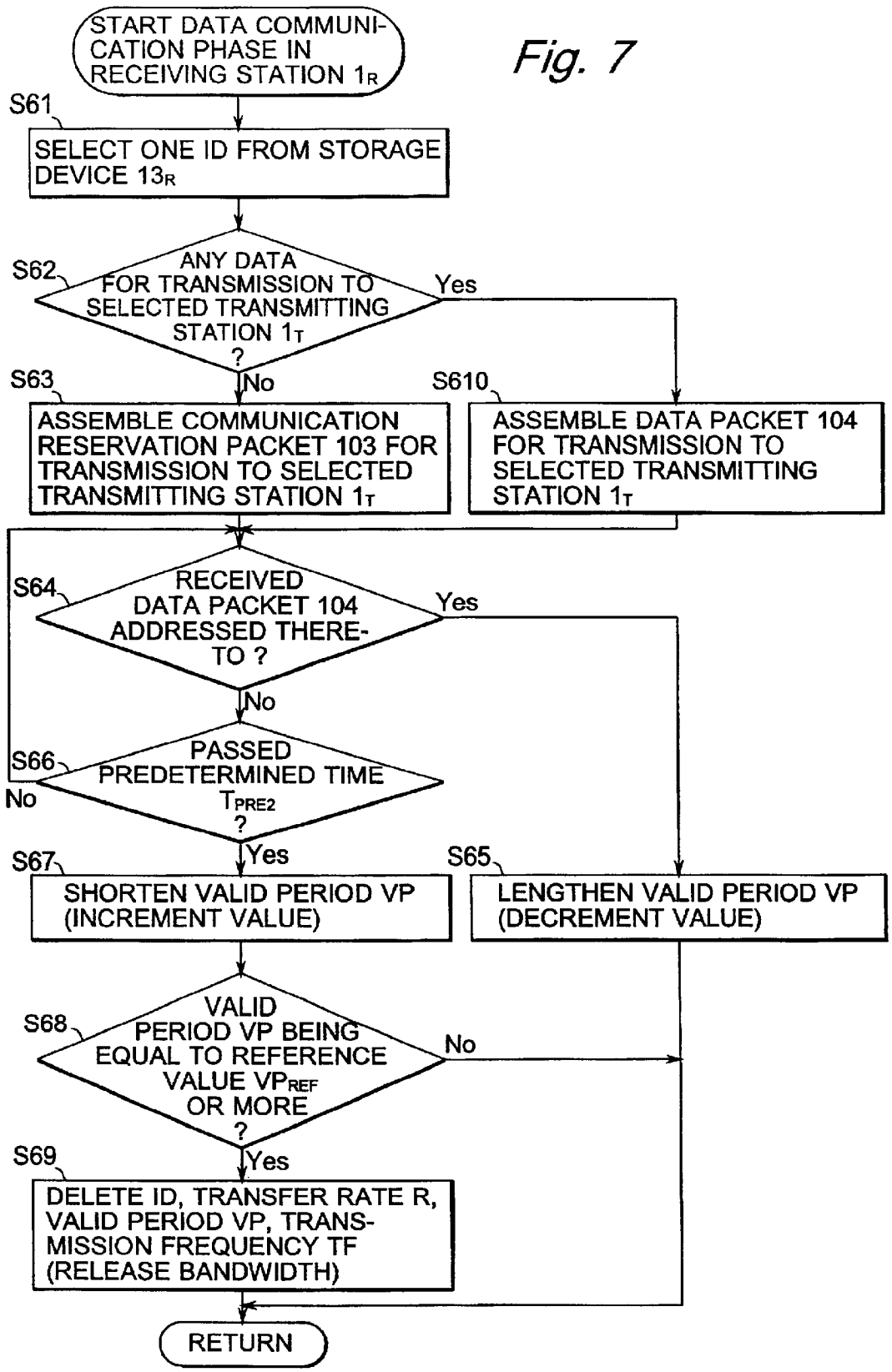
FIG. 7 is a detailed flowchart illustrating a data communication phase on the receiving station $1_R$ side.

Next, the communication controller $11_R$ goes to the data communication phase for processing (step S6). FIG. 7 is a detailed flowchart illustrating step S6.

In FIG. 7, the communication controller $11_R$ first selects one identifier ID from the storage device $13_R$ (see FIG. 11a, 11b, or 11c) (step S61). In this manner, the communication controller $11_R$ selects the destination of the packet in this processing.

Second, the communication controller $11_R$ decides if there is data for transmission to the selected transmitting station $1_T$ (step S62). The judgement in step S62 is dependent on if the communication controller $11_R$ has received, exemplarily from an application in the upper layer, any data for transmission to the transmitting station $1_T$ selected in step S61.

If the communication controller $11_R$ has no data for transmission to the selected transmitting station $1_T$, the procedure goes to step S63. If any, the procedure goes to later-described step S610.

In step S63, the communication controller $11_R$ retrieves, from the storage device $13_R$, the identifier ID selected in step S61 and the valid period VP found in the same set as the ID. The identifier ID of the transmitting station 1, is used as the destination identifier DID for the communication reservation packet 103 to be transmitted in this processing. The communication controller $11_R$ also obtains the identifier ID of the receiving station $1_R$ and the packet type T indicating the communication reservation packet 103. The identifier ID of the receiving station $1_R$ is used as the source identifier SID for the communication reservation packet 103 to be transmitted in this processing.

The communication controller $11_R$ calculates a first CRC (Cyclic Redundancy Check) value according to the packet type T, the source identifier SID, the destination identifier DID, and the valid period VP. The first CRC value is obtained from a given generation polynomial as a function of the details of the packet type T, the source identifier SID, the destination identifier DID, and the valid period VP The first CRC value is used as the frame check sequence to be set to the communication reservation packet 103 to be transmitted in this processing.

The communication controller 11R then assembles the communication reservation packet 103 (see FIG. 4c) from the packet type T, the unique word UW, the newly obtained frame check sequence FCS in addition to the valid period VP. Herein, as is described in the foregoing, the communication reservation packet 103 does not include the source identifier SID and the destination identifier DID therein. The communication reservation packet 103 is sent out to the wireless transmission path 2 via the transmitter 14, (step S63), and is received by the transmitting station $1_T$.

Next, the communication controller $11_R$ judges whether the data packet 104 (see FIG. 4d) addressed to the receiving station $1_R$ has arrived from the wireless transmission path 2 via the receiver $15_R$ (Step S64). As to the reception operation in step S64, it is later described by referring to step S143 in FIG. 10, and is not now described.

When the data packet 104 addressed to the receiving station $1_R$ is received, the communication controller $11_R$ lengthens the valid period VP found in the same set as the selected identifier ID (Step S65). In this embodiment, in step S65, the communication controller $11_R$ exemplarily decrements the current valid period VP by the given value $\Delta VP_1$ (where $\Delta VP_1$ is an arbitrary number) so as to lengthen the valid period VP.

The communication controller $11_R$ is now through with the data communication phase in FIG. 5 (step 6), and the procedure goes to step S7.

If the data packet 104 addressed to the receiving station $1_R$ is not received in step S64, the communication controller $11_R$ judges whether a predetermined time $T_{PRE2}$ has elapsed since the communication reservation packet 103 was sent out (step S66).

The time $T_{PRE2}$ is assumptive that the data packet 104 from the transmitting station [1], which received the communication reservation packet 103 would have reached the receiving station $1_R$ by the time. More specifically, the time $T_{PRE2}$ is a sum of time required for the communication reservation packet 103 to be transferred from the receiving station $1_R$ to the transmitting station $1_T$, time required for the transmitting station $1_T$ to send out the data packet 104 to the wireless transmission path 2 after received the communication reservation packet 103, time required for the data packet 104 to be transferred from the transmitting station $1_T$ to the receiving station $1_R$, and a time margin.

If the time $T_{PRE2}$ is not passed yet in step S66, the procedure returns to step S64 so that the communication controller llwaits for the data packet 104.

If the given time $T_{PRE2}$ has been passed, the communication controller $11_R$ can judge that the transmitting station $1_T$ which has received the communication reservation packet 103 did not transmit the data packet 104, and thus shortens the valid period VP found in the same set as the selected identifier ID (Step S67). In this embodiment, in step S67, the communication controller $11_R$ exemplarily increments the current valid period VP by the given value $\Delta VP_2$ (where $\Delta VP_2$ is an arbitrary number) so as to shorten the valid period VP.

Next, the communication controller $11_R$ compares the shortened valid period VP with the given reference value $VP_{REF}$ (step S66). In this embodiment, the valid period VP is lengthened after decremented by the value $\Delta VP_1$, and is shortened after incremented by the value $\Delta VP_2$. In such case, the reference value $VP_{REF}$ needs to satisfy $VP_0$ ($VP_{REF}$.

If the valid period VP is less than the reference value $VP_{REF}$, the communication controller $11_R$ is through with the data communication phase in FIG. 5 (step S6) so as to keep the bandwidth reserved for the transmitting station $1_T$. Thus, the procedure goes to step S7.

If the valid period VP is equal to or more than the reference value $VP_{REF}$, the communication controller $11_R$ deletes, so as to release the bandwidth reserved for the transmitting station $1_T$, the identifier ID of the transmitting station $1_T$, and the transfer rate R, the valid period VP, and the transmission frequency TF found in the same set as the identifier ID from the storage device $13_R$ (step S69). The communication controller $11_R$ is now through with step S6, and the procedure goes to step S7.

Herein, step S62 is referred to again. While the receiving station $1_R$ is receiving data from the transmitting station $1_T$, some data may be generated in the receiving station $1_R$ for transmission to the transmitting station $1_T$. Accordingly, if the receiving station $1_R$ has any data for transmission to the transmitting station $1_T$ in step S62, the communication controller $11_R$ divides the data into several data blocks DB before the procedure goes to step S610.

Next, the communication controller $11_R$ obtains, for the data packet 104, the packet type T, the identifier ID of the receiving station $1_R$, and the identifier ID of the transmitting station $1_T$, and one of the data blocks DB. Herein, the identifier ID of the receiving station $1_R$ and the identifier ID of the transmitting station $1_T$ are respectively used as the source identifier SID and the destination identifier DID of the to-be-assembled data packet 104.

The communication controller 11R calculates a first CRC value for the frame check sequence FCS for the data packet 104 to be assembled. The first CRC value is calculated by substituting the function of the details of the packet type T, the source identifier SID, the destination identifier DID, and the valid period VP to the above described generation polynomial.

Thereafter, the communication controller $11_R$ assembles the data packet 104. Herein, the communication controller $11_R$ assembles such data packet 104 as shown in FIG. 4d from the packet type T, the unique word UW, and the frame check sequence FCS in addition to the data block DB. Note that, the data packet 104 does not include the destination identifier DID and the source identifier SID for the purpose of making the packet length shorter.

The communication controller 11R sends out the assembled data packet 104 to the wireless transmission path 2 via the transmitter 14R (step S610), and the procedure goes to step S64.

After being through with step S6, the communication controller $11_R$ judges whether N pieces of communication reservation packets 103 have been sent out (step S7).

If not yet, the communication controller $11_R$ goes to step S6 again so as to send out a new communication reservation packet 103 to the wireless transmission path 2.

If N piece(s) of communication reservation packets 103 have been sent out, the procedure goes to step S8.

By the time the procedure reaches step S8, one unit packet frame PF (see FIG. 2 or 3) has been through. The communication controller $11_R$ determines how many request inquiry packets 101 are to be transmitted in total M for the next unit packet frame PF (step S8). Although any manner will do to determine the number M, it is preferable to be based on how much bandwidth being left unused. To be specific, preferably, the more bandwidth being left unused, the larger the number M becomes.

After the number M is determined for the next unit packet frame PF, the procedure returns to step S3 so that the communication controller $11_R$ repeats the reservation phase and the data communication phase in the same manner as the above, and receives data from the transmitting stations $1_T$.

Figure 8:
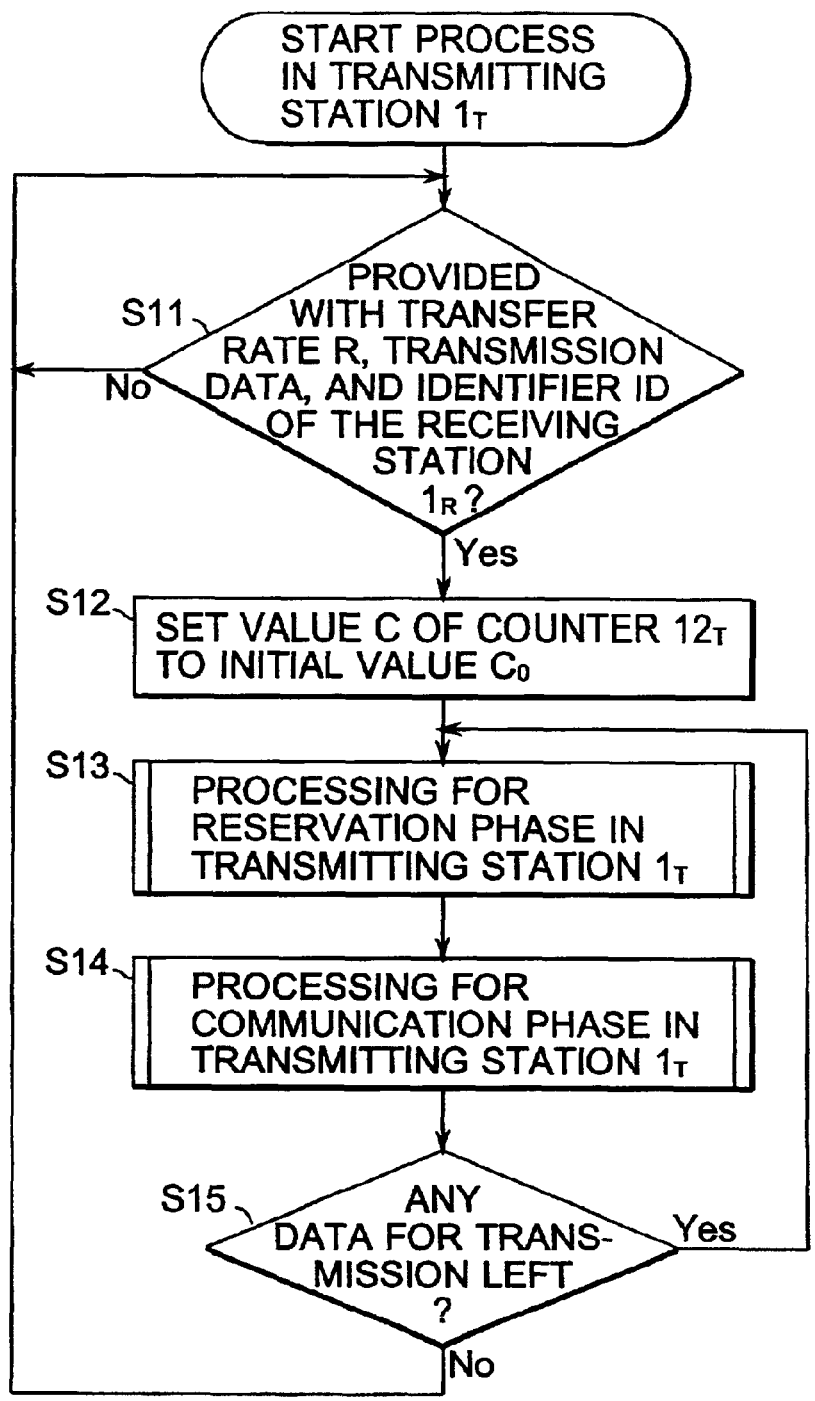
FIG. 8 is a main flowchart illustrating the procedure carried out by a transmitting station $1_T$.

Next, by referring to FIG. 8 for flowchart, the operation of one transmitting station $1_T$ is described in detail. In FIG. 8, the communication controller $11_T$ receives data for transmission to a certain communication station 1 (the receiving station $1_R$), the transfer rate R necessary for the data transmission, and the identifier ID of the receiving station $1_R$ from an application in an upper layer or an interface (step S11), and the procedure goes to step S12.

Then, the communication controller $11_T$ sets a value C of the counter $12_T$ to an initial value $C_0$ (step S12). The value C of the counter $12_T$ is substantially the same as the valid period VP controlled on the receiving station $1_R$ side.

Further, immediately after step S11 is complete, the receiving station $1_R$ does not yet reserve any bandwidth for the transmitting station $1_T$. Accordingly, at this point in time, the valid period VP of the transmitting station $1_T$ is regarded as having reached the reference value $V_{PREF}$ and being invalid. By taking this into consideration, the initial value $C_0$ is preferably not less than the reference value $V_{PREF}$ of the valid period VP. More preferably, the initial value $C_0$ is set to be equal to the reference value $V_{PREF}$.

Figure 9:
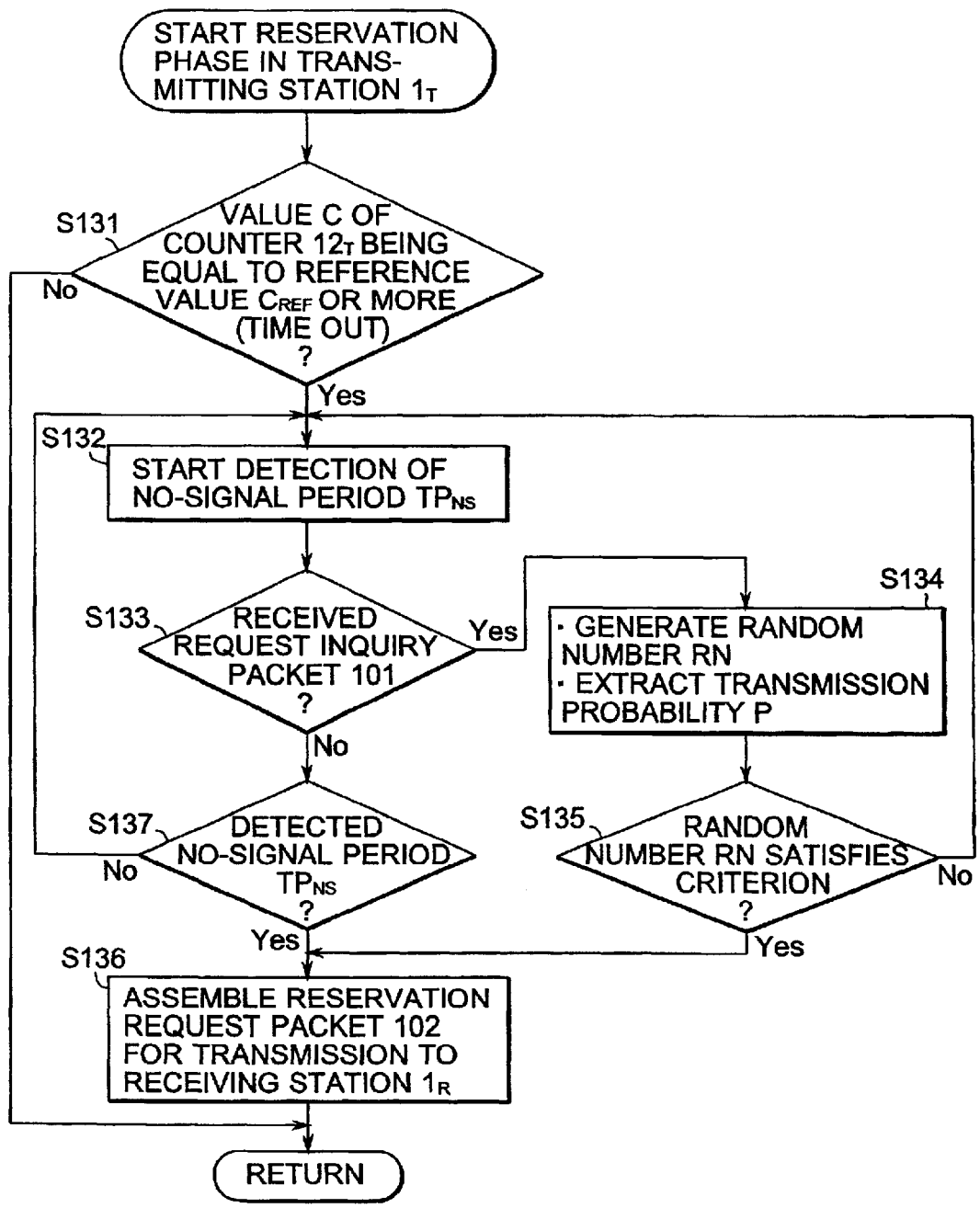
FIG. 9 is a detailed flowchart illustrating the procedure for a reservation phase on the transmitting station $1_T$ side.

Thereafter, the communication controller $11_T$ goes to the reservation phase (step S13). FIG. 9 is a detailed flowchart illustrating step S13. In FIG. 9, the communication controller $11_T$ compares the current value C of the counter $12_T$ with an internally-stored reference value $C_{REF}$ (step S131). It is preferable that the reference value $C_{REF}$ being equal to the $VP_{REF}$ on the receiving station side $1_R$.

When the current value C is less than the reference value $C_{REF}$, the communication controller $11_T$ regards that the valid period VP of the transmitting station $1_T$ is yet valid, and the procedure skips steps onward (steps S132 to S137) and goes to the data communication phase in step S14.

When the current value C is equal to the reference value $C_{REF}$ or more, the communication controller $11_T$ judges it as being immediately after data for transmission to the receiving station $1_R$ is generated or some bandwidth once assigned to the transmitting station $1_T$ is released by the receiving station $1_R$, and then starts detecting a no-signal period $TP_{NS}$ (step S132). The no-signal period $TP_{NS}$ is selected according to the design specifications of the communication system CS, and more specifically, indicates time required from a certain request inquiry packet 101 being received by the transmitting station $1_T$ to the next request inquiry packet 101 being transferred thereto, and a time margin.

Thereafter, the communication controller $11_T$ judges whether the request inquiry packet 101 (see FIG. 4a) is transmitted from the receiving station $1_R$ through both the wireless transmission path 2 and the receiver $15_T$ (step S133).

The reception operation in step S133 is described next below. First, when some signal is received from the wireless transmission path 2, the communication controller $11_T$ detects the unique word UW included therein. Then, the communication controller $11_T$ extracts the packet type T subsequent to the unique word UW. If the packet type T indicates the request inquiry packet 101, the communication controller $11_T$ extracts the source identifier SID. When the source identifier SID coincides with the identifier ID of the receiving station $1_R$ obtained in step S11, the communication controller $11_T$ regards the request inquiry packet 101 as being received from the receiving station $1_R$, and the procedure goes to step S134. When the communication controller $11_T$ regards that the received signal is not the request inquiry packet 101 from the receiving station $1_R$, the communication controller discards the received signal and the procedure goes to later-described step S137.

In step S134, the communication controller $11_T$ generates a random number RN (where RN satisfies $0<RN\leq=1$). The communication controller $11_T$ also extracts the transmission probability value P from the received request inquiry packet 101 (step S134).

Then, the communication controller $11_T$ compares the random number RN obtained in step S134 with the transmission probability value P for the judgement whether the random number RN satisfies a given criterion (step S135). If satisfied, the communication controller $11_T$ judges that the transmission of the reservation request packet 102 is permitted, and the procedure goes to step S136. If not satisfied, the procedure returns to step S132 so that the communication controller $11_T$ starts detecting the no-signal period $TP_{NS}$ and then waits for a new request inquiry packet 101.

The judgement operation in step S135 is exemplarily described next below. The transmission probability value P is the probability of the transmission of the reservation request packet 102 in response to the request inquiry packet 101 received by the transmitting station $1_T$. For example, the transmission probability value P of 0.3 indicates that the transmitting station $1_T$ is allowed to transmit the reservation request packet 102 with a probability of 30%. The random number RN takes any number among 0.1, 0.2 . . . 1. If this is the case, the communication controller $11_T$ compares the generated random number RN with the transmission probability value P so as to judge whether or RN≦P is satisfied. If satisfied, the communication controller $11_T$ regards that the transmission of the reservation request packet 102 is permitted, and the procedure goes to step S136. If not satisfied, the procedure returns to step S132.

In step S136, the communication controller $11_T$ assembles the reservation request packet 102 (see FIG. 4b) from the identifier ID of the receiving station $1_R$ obtained as the destination identifier DID exemplarily in step S11, the identifier ID of the transmitting station $1_T$ as the source identifier SID, the packet type T indicating the reservation request packet 102, the unique word UW, and the frame check sequence FCS in addition to the transfer rate R obtained in step S11, and sends out the packet to the wireless transmission path 2 via the transmitter $14_T$ (step S136). The communication controller $11_T$ is through with the reservation phase in FIG. 8 (step S13), and the procedure goes to step S14.

Note that, the reservation request packet 102 sent out to the wireless transmission path 2 is received by the receiving station $1_R$. In response thereto, the receiving station $1_R$ goes to the processing described in step S35 in FIG. 6.

Herein, step S133 is referred to again. When the request inquiry packet 101 is not received, the communication controller $11_T$ judges whether the no-signal period $TP_{NS}$ was detected on the wireless transmission path 2 (step S137).

When the no-signal period $TP_{NS}$ is not detected, the communication controller $11_T$ decides that now is the time to transmit the reservation request packet 102, and the procedure goes to step S136. Then, the communication controller $11_T$ assembles the reservation request packet 102 in the same manner as the above for transmission to the receiving station $1_R$ (step S136). The communication controller $11_T$ is through with the reservation phase in FIG. 8 (step S13), and the procedure goes to step S14.

When the no-signal period $TP_{NS}$ is not detected in step S137, the communication controller $11_T$ decides that now is not the time to transmit the reservation request packet 102. In this case, the procedure returns to step S132 so that the communication controller $11_T$ starts detecting the no-signal period $TP_{NS}$ and waits for a new request inquiry packet 101.

Figure 10:
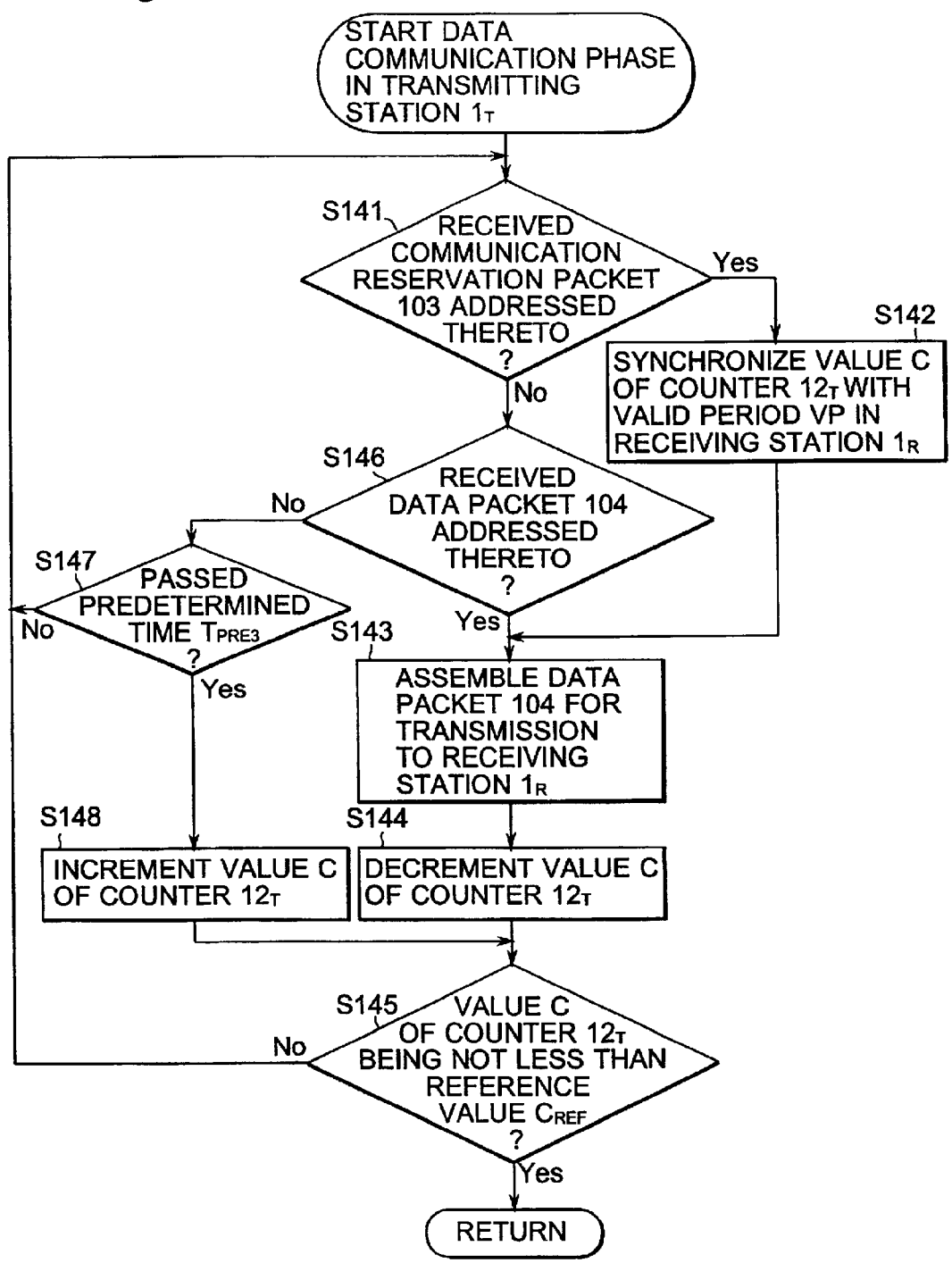
FIG. 10 is a detailed flowchart illustrating a data communication phase on the transmitting station $1_T$ side.

The communication controller $11_T$ then goes to the data communication phase after being through the reservation phase (step S13 in FIG. 8) (step S14). FIG. 10 is a detailed flowchart illustrating step S14. In FIG. 10, the communication controller $11_T$ judges whether or not the communication reservation packet 103 (see FIG. 4c) addressed to the transmitting station $1_T$ is transmitted from the receiving station $1_R$ through the wireless transmission path 2 and the receiver $15_T$ (step S141).

Figure 12:
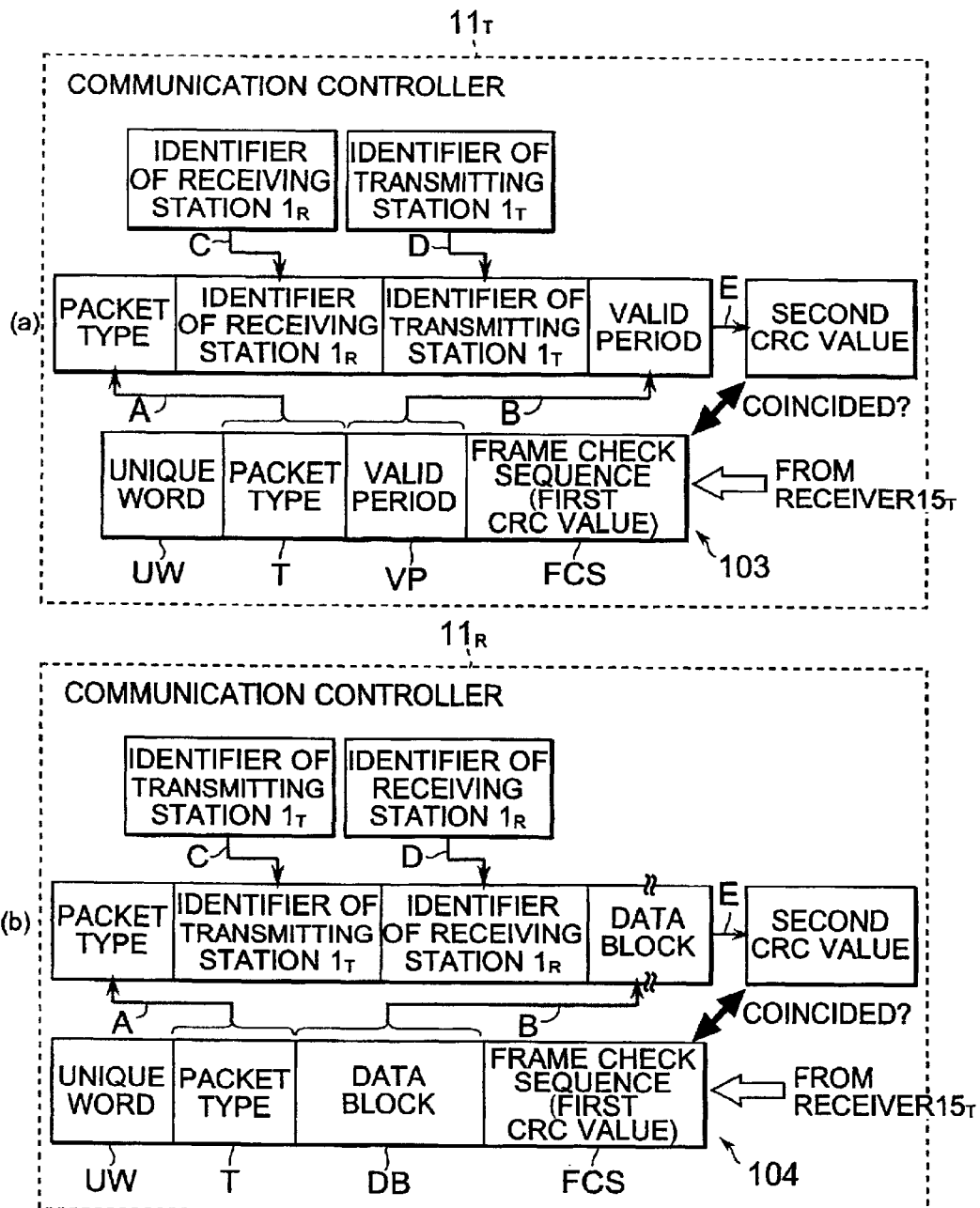
FIGS. 12a and 12b are diagrams for each illustrating how to disassemble a communication reservation packet 103 and a data packet 104.

As being peculiar to the present invention, the reception operation in step S141 is described by referring to FIG. 12a. After detected an incoming signal from the wireless transmission path 2, the communication controller 11T detects the unique word UW included therein. The communication controller $11_T$ then extracts the packet type T subsequent to the unique word UW (see arrow A).

When the packet type T indicates the communication reservation packet 103, the communication controller $11_T$ extracts the valid period VP from the received communication reservation packet 103 (see arrow B). The communication controller $11_T$ also retrieves the identifier ID of the receiving station $1_R$ obtained exemplarily in step S11 and the previously-stored identifier ID of the transmitting station $1_T$ (See arrows C and D). The communication controller $11_T$ substitutes the packet type T, the identifier ID of the receiving station $1_R$, and the identifier ID of the transmitting station $1_T$, and the valid period VP to the above-described generation polynomial so as to calculate a second CRC value for judgement (see arrow E)

As is described in step S63, the frame check sequence FCS of the communication reservation packet 103, i.e., the first CRC value is calculated from the packet type T, the source identifier SID (i.e., identifier ID of the receiving station $1_R$), the destination identifier DID (i.e., identifier ID of the transmitting station $1_T$), and the valid period VP. Accordingly, assuming that the transmitting station $1_T$ is the correct destination of the communication reservation packet 103, the second CRC value coincides with the first CRC value of the communication reservation packet 103. If the values agree with each other, the communication controller $11_T$ regards that the received communication reservation packet 103 is the one addressed to the transmitting station $1_T$, and no error is detected therein.

When the communication controller $11_T$ could not receive the communication reservation packet 103 addressed to the transmitting station $1_T$ in step S141, the procedure goes to later-described step S146. On the other hand, when received, the communication controller $11_T$ so updates the value C of the counter $12_T$ that the valid period VP controlled in the receiving station $1_R$ coincides therewith (step S142). In this manner, the value C of the counter $12_T$ is synchronized with the valid period VP.

Next, the communication controller $11_T$ obtains, for the data packet 104, the packet type T, the identifier ID of the transmitting station $1_T$, the identifier ID of the receiving station $1_R$, and one data block DB. Herein, the identifier ID of the transmitting station $1_T$ and the identifier ID of the receiving station $1_R$ are respectively used as the source identifier SID and the destination identifier DID for the data packet 104 to be assembled.

The communication controller $11_T$ calculates the first CRC value for the data packet 104 to be assembled as the frame check sequence FCS. The first CRC value is calculated by substituting, to the above-described generation polynomial, the function of the details of the data packet T, the source identifier SID, the destination identifier DID, and the data block DB.

Thereafter, the communication controller $11_T$ assembles the data packet 104. Herein, the communication controller $11_T$ assembles such data packet 104 as shown in FIG. 4d from the packet type T, the unique word UW, and the frame check sequence FCS in addition to the data block DB. Note that, the data packet 104 does not include the source identifier SID and the destination identifier DID for the purpose of making the packet length shorter.

The communication controller $11_T$ sends out the assembled data packet 104 to the wireless transmission path 2 via the transmitter $14_T$ (step S143). After receiving the data packet 104, the receiving station $1_R$ goes to the processing in step S64 in FIG. 7 so as to receive and disassemble the data packet 104.

Step S64 for the receiving station $1_R$ is now described by referring to FIG. 12b. The communication controller $11_R$ detects the unique word UW included in an incoming signal from the wireless transmission path 2, and then extracts the packet type T subsequent thereto (see arrow A).

When the packet type T indicates the data packet 104, the communication controller $11_R$ extracts the data block DB therefrom (see arrow B). The communication controller $11_R$ also extracts the identifier ID of the transmitting station $1_T$ obtained exemplarily in step S35, and the previously-stored identifier ID of the receiving station $1_R$ (see arrows C and D). The communication controller $11_R$ substitutes, to the above-described generation polynomial, the packet type T, the identifier ID of the transmitting station $1_T$, the identifier ID of the receiving station $1_R$, and the data block DB so as to calculate the second CRC value for judgement (see arrow E).

The frame check sequence FCS of the data packet 104, i.e., the first CRC value is calculated, as described in step S143, from the packet type T, the source identifier SID (i.e., identifier ID of the transmitting station $1_T$), the destination identifier DID (i.e., identifier ID of the receiving station $1_R$), and the data block DB. Accordingly, assuming that the receiving station R is the correct destination of the data packet 104, the calculated second CRC value coincides with the first CRC value of the data packet 104. When the values agree with each other, the communication controller $11_R$ regards that the received data packet 104 is the one addressed to the receiving station $1_R$ and no error is detected therein, and the procedure goes to step S65 in FIG. 7. When the values do not agree with each other, the procedure goes to step S66.

FIG. 10 is referred to again. Since the transmitting station $1_T$ has transmitted the data packet 104 in step S143, the valid period VP assigned thereto is lengthened on the receiving station $1_R$ side. Accordingly, after step S143 is through, the communication controller $11_T$ updates the current value C of the counter $12_T$ (step S144). Since the receiving station 1, lengthens the valid period VP by (VP-ΔVP) in this embodiment, the communication controller $11_T$ decrements the current value C of the counter $12_T$ by a given value ΔC. Herein, in order to synchronize between the value C of the transmitting station $1_T$ and the valid period VP of the receiving station $1_R$, it is preferable that the value ΔC is equal to the value ΔVP.

Next, the communication controller $11_T$ judges whether the current value C of the counter $12_T$ is equal to a reference value $C_{REF}$ or more (step S145).

If the value C is less than reference value $C_{REF}$, the communication controller $11_T$ regards that the valid period of the transmitting station $1_T$ is still valid, and the procedure returns to S141 so that the communication controller $11_T$ keeps going through the data communication phase.

If the value C is not less than the reference value $C_{REF}$ in step S145, it is useless for the communication controller $11_T$ going through the data communication phase. Thus, the communication controller $11_T$ is through with the data communication phase in FIG. 10 (step S14), and the procedure goes to step S15 in FIG. 8.

Step S 141 in FIG. 10 is referred to again. Immediately after the communication controller $11_T$ judged that the received signal is not the communication reservation packet 103 addressed to the transmitting station $1_T$, the procedure goes to step S146. Thereafter, the communication controller $11_T$ judges whether the data packet 104 (transmitted in step S610) addressed to the transmitting station $1_T$ has arrived (step S146). Since the reception operation in step S146 is similar to step S64 in FIG. 7 (see FIG. 12b), it is not described again.

In a case where the data packet 104 arrives the communication controller $11_T$ in step S146, the procedure goes through steps S143 and S144 before the communication controller $11_T$ being through with the data communication phase in FIG. 10 (step S14), and then the procedure goes to step S15 in FIG. 8.

On the other hand, when the data packet 104 is not received, the communication controller $11_T$ judges whether a predetermined time $T_{PRE2}$ has elapsed since the reservation request packet 102 was transmitted in step S136 (step S147).

The time $T_{PRE3}$ is assumptive that the communication reservation packet 103 from the receiving station $1_R$ would have reached the transmitting station $1_T$ by the time. More specifically, the time $T_{PRE3}$ is a sum of time required for the reservation request packet 102 to be transferred from the transmitting station $1_T$ to the receiving station $1_R$, time required for the receiving station $1_R$ to send out the communication reservation packet 103 to the wireless transmission path 2 after received the reservation request packet 102, time required for the communication reservation packet 103 to be transferred from the receiving station $1_R$ to the transmitting station $1_T$, and a time margin.

If the predetermined time $T_{PRE3}$ is not passed yet, the procedure returns to step S141 so that the communication controller $11_T$ waits for the communication reservation packet 103 addressed to the transmitting station $1_T$.

If the predetermined time $T_{PR3}$ has been passed, the communication controller $11_R$ can regard that the communication reservation packet 103 which was supposed to be transmitted from the receiving station $1_R$ did not arrive. If this is the case, it is assumable that the receiving station $1_R$ shortens the valid period VP of the transmitting station $1_T$, thus the procedure goes to step S148 so that the communication controller $11_T$ updates the current value C of the counter 12, (step S148). In this embodiment, the receiving station $1_R$ shortens the valid period VP by (VP+ΔVP). Therefore, the communication controller $11_T$ increments the current value C of the counter $12_T$ by the value ΔC.

After step S148 is thorough, the communication controller $11_T$ is through with the data communication phase in FIG. 10 (step S14), and the procedure goes to step S15 in FIG. 8.

In step S15, the communication controller $11_T$ judges whether any data block DB is left for transmission to the receiving station $1_R$ (step S15). When there is any data block DB being left, the procedure returns to step S13 for the processing in FIG. 9 again. If not, the procedure returns to step S11 so that the communication controller $11_T$ waits for new data, for example.

Figure 13:
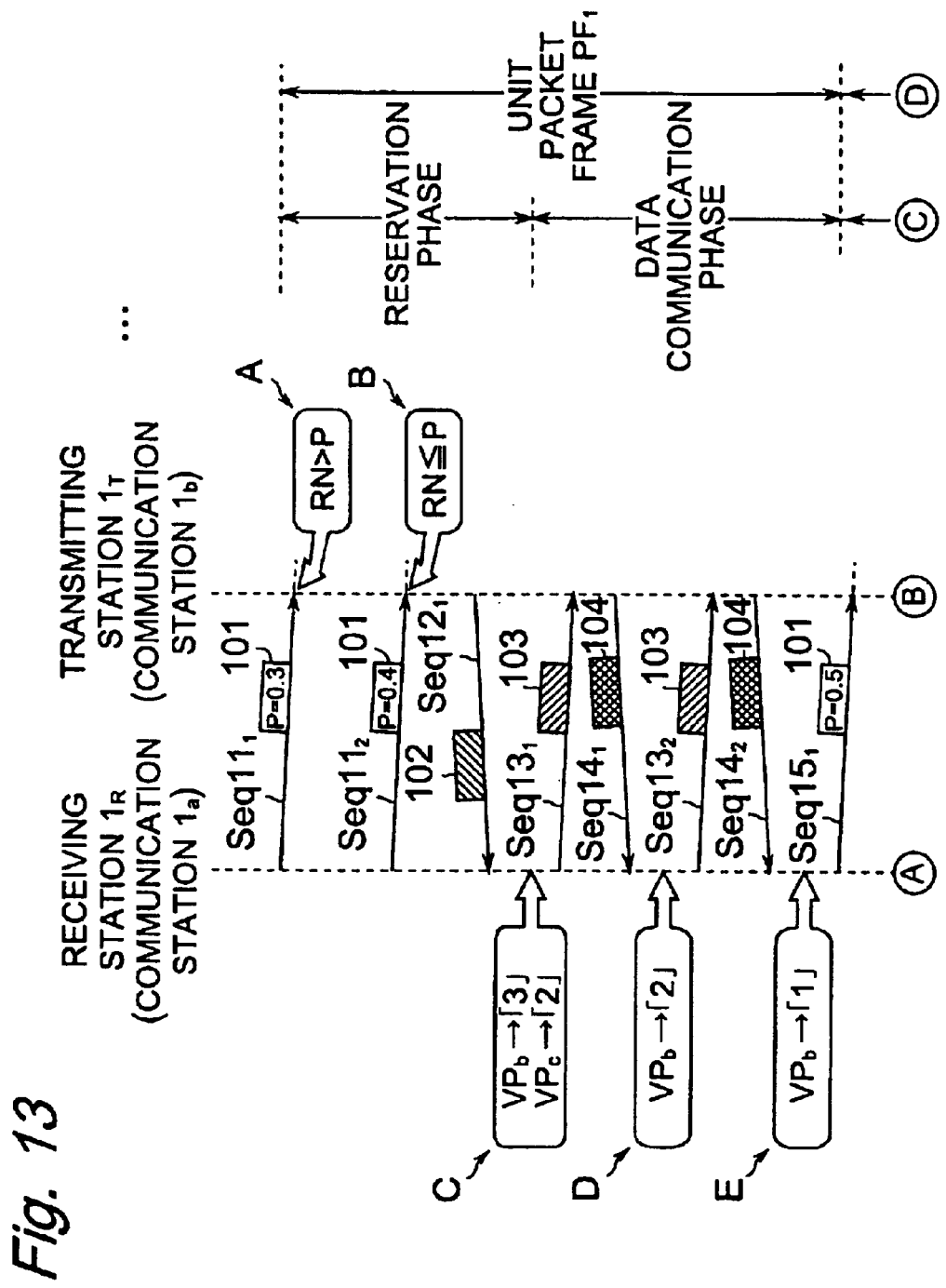
FIG. 13 is the first half of a sequence chart exemplarily illustrating how data is transmitted from the transmitting station $1_T$ to the receiving station $1_R$.
Figure 14:
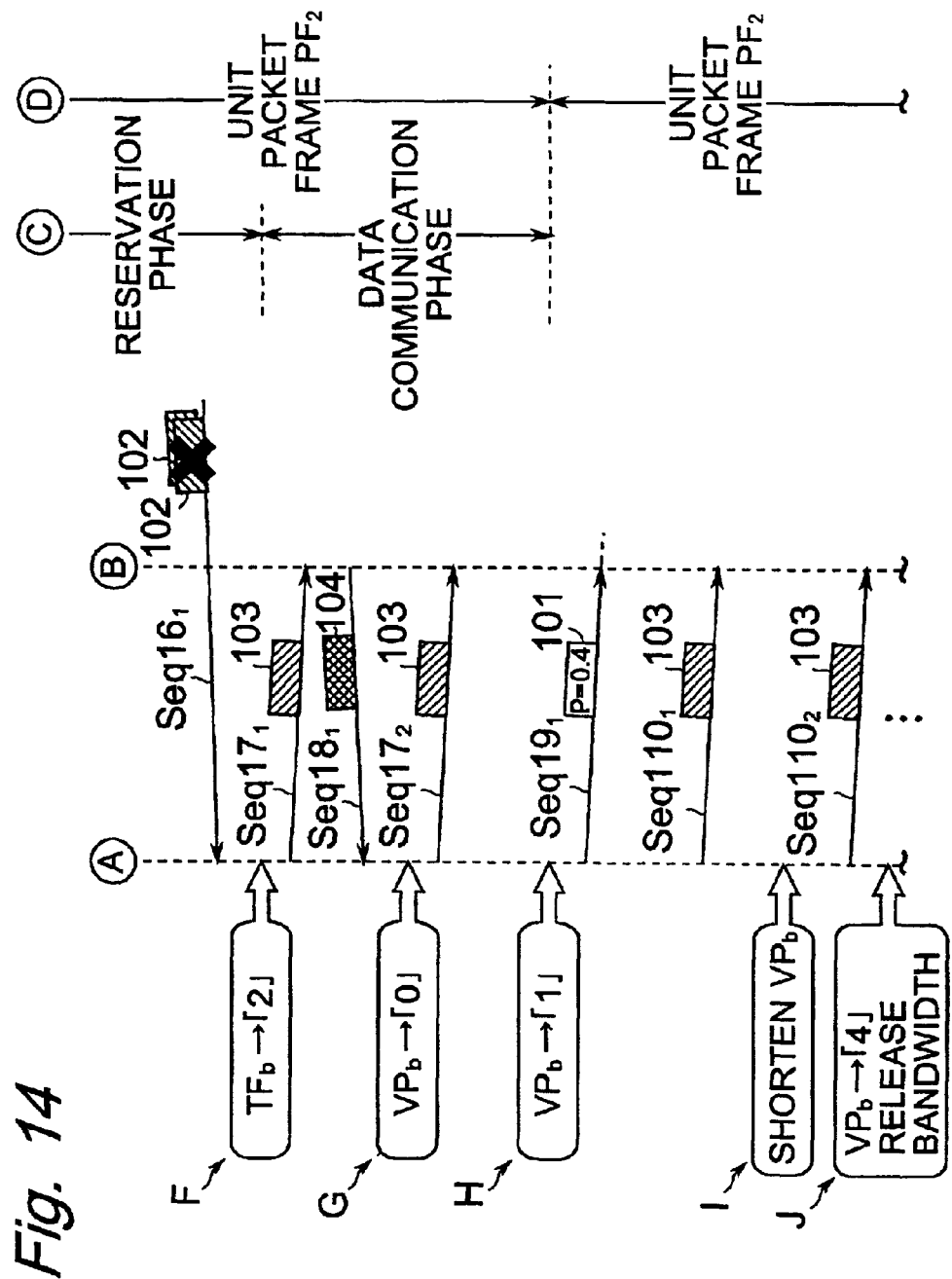
FIG. 14 is the second half of a sequence chart exemplarily illustrating how data is transmitted from the transmitting station $1_T$ to the receiving station $1_R$.

The procedure for both the receiving stations $1_R$ and the transmitting stations $1_T$ is now thoroughly described in a specific manner. With the procedure, such communication shown in the sequence charts in FIGS. 13 and 14 is carried out between the receiving stations $1_R$ and the transmitting stations $1_T$. It is assumed next below that the communication station $1_a$ operates as the receiving station $1_R$, and the communication station $1_b$ operates as the transmitting station $1_T$.

First, the communication station $1_a$ goes through steps S1 and S2 in FIG. 5. For convenience, the initial value $P_0$ of the transmission probability value P is "0.3", and the initial value $M_0$ of the transmission number M is "2". Next, the communication station $1_a$ assembles one request inquiry packet 101 (see FIG. 4a) (FIG. 6; step S31). The request inquiry packet 101 includes the identifier ID "a" as the source identifier SID and the transmission probability value P of "0.3", and is sent out to the transmission path 2 (sequence $Seq11_1$). Then, the communication station $1_a$ waits for the reservation request packet 102 addressed thereto from the communication stations 1 (except the communication station 1).

At the time of sequence Seq11$_1$, the communication station 1$_b$ is through with steps S11 and S12 in FIG. 8, obtained the identifier ID"a" of the receiving station 1$_R$ from an application in an upper layer etc., and set the initial value C$_0$ of the counter 12$_b$ to "3".

After step S12 is through, the procedure goes to steps S131 and S132 in FIG. 9. Herein, the reference value C$_{REF}$ is assumed to be "3".

The communication station 1$_b$ then receives the request inquiry packet 101 transmitted in sequence Seq11$_1$ (step S133), and generates the random number RN (step S134). Assuming that the generated random number RN is "0.4", the communication station 1$_b$ decides that "RN≦P" is not satisfied since the transmission probability value P of the received request inquiry packet 101 is "0.3" (step S135, see arrow A in FIG. 13). Thus, the procedure returns to step S132, and the communication station 1$_b$ waits for a new request inquiry packet 101.

As is described in the foregoing, the communication station 1$_b$ does not transmit the reservation request packet 102. Assuming that none of other communication stations 1 responded to the request inquiry packet 101 transmitted in sequence Seq11$_1$ the communication station 1$_a$ repeats the processing in steps S32 to S38 until the predetermined time T$_{PRE1}$ is passed. The procedure then goes to step S36. If this is the case, the communication station 1$_a$ presumably determines that the wireless transmission path 2 is not congested and increases the transmission probability value P to "0.4" (step S36).

Since the transmission number M is "2" and so far one request inquiry packet 101 has been transmitted, the procedure returns to step S3 after step S4 in FIG. 5.

The communication station 1$_a$ then assembles one request inquiry packet 101 (step S31 in FIG. 6). The request inquiry packet 101 is provided with the transmission probability value P of "0.4", and is sent out to the wireless transmission path 2 (sequence Seq11$_2$). Thereafter, the communication station 1$_a$ waits for the reservation request packet 102 addressed thereto.

During sequences Seq11$_2$, and Seq11$_2$, a loop which consists of steps S132, S133 and S137 is repeated. At this time, the communication station 1$_b$ receives the request inquiry packet 101 transmitted in sequence Seqll$_2$ after received the request inquiry packet 101 transmitted in sequence Seq11$_2$, but before detecting the no-signal period TP$_{NS}$. Therefore, the procedure goes to step S134, and the communication station 1$_b$ generates the random number RN. The random number RN herein is presumed to be "0.2". If this is the case, the communication station 1$_b$ determines that "RN≦P" is satisfied in step S135 since the current transmission probability value P is "0.4" (see arrow B in FIG. 13).

The procedure then goes to step S136 so that the communication station 1$_b$ assembles one reservation request packet 102 (see FIG. 4b), sends out the packet to the communication station 1$_a$ (sequence Seq12$_1$), and waits for the communication reservation packet 103 therefrom.

Although a loop which consists of steps S32 and S38 is repeated, the communication station 1amay receive the reservation request packet 102 transmitted in sequence Seq12$_1$ before the predetermined time T$_{PRE1}$ is passed. Thus, the procedure goes to step S33 after step S32 is through. Assuming that currently no communication collision has occurred, the communication station 1$_a$ disassembles the received packet in step S34 and regards that the reservation request packet 102 addressed has arrived. Thereafter, the communication station 1$_a$ registers the transfer rate R, "b" as the source identification SID, and the initial value VPO of the valid period VP$_b$, which are extracted from the received reservation request packet 102, in the storage device 13a as a set. Herein, the initial value VP$_0$ is assumed to be "3".

Thereafter, the transmission probability value P is increased (step S36). Then, since two request inquiry packets 101 have been transmitted, the procedure goes to step S5 after step S4 is through. At this point in time, the communication station 1$_a$ has only received the reservation request packet 102 from the communication station 1$_b$, the transmission frequency TF with respect to the communication station 1$_b$ is defined. The transmission frequency TF$_b$ is assumed to be "2" (see arrow C in FIG. 13).

Next, the communication station 1$_a$ selects "b" for the registered identifier ID, and then assembles the communication reservation packet 103 including the valid period VP$_b$ of "3" (steps S61 to S63 in FIG. 7). To the communication reservation packet 103 in this example, the valid period VP$_b$ of "3" is set. Further, to the frame check sequence FCS, the above-described first CRC value is set. The communication station 1$_a$ sends out the assembled communication reservation packet 103 to the communication station 1$_b$ through the wireless transmission path 2 (sequence Seq13$_1$), then, waits for the data packet 104 addressed thereto.

After the reservation request packet 102 is sent out in sequence Seq12$_1$, the communication station 1$_b$ goes to the data communication phase in FIG. 10. Assuming that no signal (except the communication reservation packet 103) has been sent out to the wireless transmission path 2 during sequences Seq 12$_1$ and Seq13$_1$, the communication station 1$_b$ correctly receives the communication reservation packet 103, which is transmitted in sequence Seq13$_1$, in step S141 carried out immediately after sequence Seq13$_1$. At this time, as is described in the foregoing, the communication station 1$_b$ calculates the second CRC value, and determines that the received packet is the communication reservation packet 103 addressed thereto.

Thereafter, the communication station 1$_b$ so updates the value C of the counter 12b that the valid period VP$_b$ of the communication reservation packet 103 coincides therewith (step S142), and then assembles one datapacket 104 (FIG. 4d) (step S143) Herein, to the frame check sequence FCS, the first CRC value is set. The communication station 1$_b$ then transmits the assembled data packet 104 to the communication station 1$_a$ through the wireless transmission path 2(sequence Seq14$_1$)

Next, the communication station 1$_b$ decrements the value C of the counter 12$_b$ by ΔC (step S144). If the value ΔC is assumed to be "1" in this example, the value C at this time is "2". Then, the communication station 1$_b$ judges whether the current value C of the counter 12$_b$ is equal to the reference value C$_{REF}$ or more (step S145). Since the reference value C$_{REF}$ is "3", the procedure returns to step S14, so that the communication station 1$_b$ waits for a new communication reservation packet 103.

Herein, it is assumed that, after the communication station 1$_a$ sent out the communication reservation packet 103 in sequence Seq13$_1$, a loop which consists of steps S64 and S66 in FIG. 7 is repeated during sequences Seq13$_1$ and Seq14$_1$. In such case, instep S64 immediately after sequence Seq14$_1$, the communication station 1$_a$ receives the data packet 104 addressed thereto which was transmitted in sequence seq14$_1$. At this time, as described in the foregoing, the communication station $1_a$ calculates the second CRC value, determines that the received packet is the data packet 104 addressed thereto, and then extracts the data block DB for storage.

Thereafter, the procedure goes to step S65 so that the communication station $1_a$ decrements the valid period VP of the communication station $1_b$ registered in the storage device $13_a$ by ΔVP so as to lengthen the valid period VP. In this example, the value ΔVP is assumed to be "1" being equal to the value ΔC. Accordingly, the valid period $VP_b$ of the communication station $1_b$ is currently "2" (see arrow D in FIG. 13).

The communication station $1_b$ is then through with the data communication phase in step S6, and the procedure goes to step S7. Since the communication station 1, does not yet transmit the communication reservation packet 103 for the required number of pieces, the procedure returns to step S6 for the data communication phase (see FIG. 7) again.

After selected "b" for the registered identifier ID, the communication station $1_a$ assembles the communication reservation packet 103 including the valid period $VP_b$ of "2" in the same manner as above (steps S61 to S63). The communication station $1_a$ then transmits the assembled communication reservation packet 103 to the communication station $1_b$ through the wireless transmission path 2 (sequence $Seq13_2$), and waits for the data packet 104 addressed thereto (steps S64 and S66).

After sent out the data packet 104 in sequence $Seq14_1$, the communication station $1_b$ goes to the reservation phase in FIG. 9. Since, at this time, the value C of the counter $12_b$ is "2" and the reference value $C_{REF}$ is "3", the communication station $1_b$ skips the reservation phase to the data communication phase in FIG. 10. Assuming that no signal has been sent out to the wireless transmission path 2 during sequences $Seq14_1$ and $Seq13_2$, a loop which consists of steps S141, 5146 and S147 is repeated. The communication station $1_b$ correctly receives, in step S141 immediately after sequence $Seq13_2$, the communication reservation packet 103 transmitted in sequence $Seq13_2$.

Then, the procedure goes to step S142 so that the communication station $1_b$ assembles one data packet 104 for transmission to the communication station $1_a$ through the wireless transmission path 2 (step S143, sequence $Seq14_2$).

Next, the communication station $1_b$ decrements the value C of the counter $12_b$ by ΔC (step S144) so as to update the value to "1". If there is any data for transmission is left, the procedure returns to the reservation phase in step S13 after step S15 in FIG. 8 is completed.

Assuming that no signal has been sent out to the wireless transmission path 2 during sequences $Seq13_2$ and $Seq14_2$, a loop which consists of steps S64 and S66 is repeated. The communication station $1_a$ receives, in step S64 immediately after sequence $Seql4_2$, the data packet 104 transmitted in sequence $Seql4_2$, and extracts the data block DB for storage.

The communication station $1_a$ then decrements the valid period VP of the communication station $1_b$ by AVP (Step S65) so as to update the value to "1".

The communication station $1_a$ is through with the data communication phase in step S6, and the procedure goes to step S7. Since the communication station $1_a$ has transmitted the communication reservation packet 103 for the required number of pieces, the procedure goes to step S8 so that the communication station $1_a$ determines the transmission number M for the next unit packet frame. In this example, the transmission number M is presumably determined as "1".

Such sequence Seq11 to Seq14 forms the first unit packet frame $PF_1$.

The communication station 1 then goes to the reservation phase in step S3, i.e., step S31 in FIG. 6, so as to assemble one request inquiry packet 101 for transmission to the wireless transmission path 2 (sequence $Seq15_1$). To the request inquiry packet 101, the transmission probability of "0.5" is set. Then, the communication station $1_a$ waits for the reservation request packet 102 from any communication station 1 having a request for data communication therewith.

For convenience, it is assumed herein that a plurality of communication stations 1 (except the communication station $1_b$) concurrently transmit the reservation request packets 102 in response to the request inquiry packets 101 transmitted in sequence $Seq15_1$, and consequently some communication collision occurs on the wireless transmission path 2 (sequence $Seq16_1$)

Herein, although a loop which consists of steps S13 to S15 is repeated in sequence $Seq15_1$, the communication station $1_b$ goes to the data communication phase directly from step S131 in the reservation phase. Therefore, the communication station $1_b$ does not receive the request inquiry packet 101.

By referring to FIG. 14 for sequence cart, the communication procedure between the communication stations $1_a$ and $1_b$ is described next below.

After sequence $Seq15_1$, steps S32 to S38 are repeated. However, since the communication station $1_a$ receives several collided reservation request packets 102 before the predetermined time $T_{PRE1}$ is passed, the procedure goes to step S37 after step S33. The communication station $1_a$ decreases the transmission probability value P (step S37) to "0.4". The procedure then returns to step S4 in FIG. 5. Since so far one request inquiry packet 101 has been transmitted, and the current transmission number M is "1", the procedure then goes to step S5. In this reservation phase, the communication station $1_a$ cannot correctly receive the reservation request packet 102 from the new communication stations 1. Therefore, in step S5, the transmission frequency $TF_b$ with respect to the transmitting station $1_b$ is presumably determined as "2" again (see arrow F in FIG. 14).

Then, the procedure goes to steps S61 to S63 in FIG. 7 so that the communication station $1_a$ selects "b" for the registered identifier ID, and assembles the communication reservation packet 103 for transmission to the communication station $1_b$ (sequence $Seq17_1$). To the communication reservation packet 103, the valid period VP of "1" is set. Thereafter, the communication station 1a waits for the data packet 104 addressed thereto.

The communication station $1_b$ has been waiting for the communication reservation packet 103 from the communication station $1_a$ after transmitted the data packet 104 in sequence $Seq14_2$, and receives the communication reservation packet 103 in step S141 immediately after sequence $Seq17_1$.

Next, in step S142, the communication station $1_b$ first equalizes the value C of the counter $12_b$ with the valid period VP of "1", and in step S143, assembles one data packet 104 for transmission to the communication station $1_a$ through the wireless transmission path 2 (sequence $Seq18_1$).

The procedure then goes to step S144 so that the communication station $1_b$ decrements the value C of the counter $12_b$ by ΔC to obtain "0" (see arrow G in FIG. 14). Then, the communication station $1_b$ determines that there is no more data for transmission (data block) left (step S15), and the procedure returns to step S11 in FIG. 8.

Assuming that no signal has been sent out to the wireless transmission path 2 after the communication station $1_a$ transmitted the communication reservation packet 103 in sequence Seq17$_1$ but before sequence Seq18$_1$. If this is the case, in step S64 immediately after sequence Seq18$_1$, the communication station 1$_a$ receives the data packet 104 transmitted in sequence Seq18, and then extracts the data block DB therefrom for storage. In this manner, the communication controller 11$_a$ of the Communication station 1$_b$ may receive every data transmitted from the communication station 1$_b$, thus transmits the data to the application in the upper layer, for example.

The communication station 1 decrements, by AVP, the valid period VP$_b$ of the communication station 1$_b$ registered in the storage device 13$a$ to obtain "0" (step S65).

Although the procedure goes to step S7 in FIG. 5, since the communication station 1$_a$ does not yet transmit the communication reservation packet 103 for the required number of pieces, the procedure returns to step S6 for the data communication phase again.

The communication station 1$_a$ selects "b" for the registered identifier ID, and then, in a similar manner to the above, assembles the communication reservation packet 103 including the valid period VP$_b$ of "0" (steps S61 to S63). The communication station 1$_a$ transmits the assembled communication reservation packet 103 to the communication station 1$_b$ through the wireless transmission path 2 (sequence Seq17$_2$), then waits for the data packet 104 therefrom.

Since the communication station 1$_b$ has already transmitted every data to the communication station 1$_a$, now is waiting for new data to be transmitted from the application of the upper layer etc., and the like (step S11 in FIG. 8). Accordingly, the communication station 1$_b$ neglects the communication reservation packet 103 transmitted in sequence Seq17$_2$. As a result, steps S64 and S66 are repeated thereafter, but the procedure soon goes to step S67 after S66.

The communication station 1$_a$ then increments, by ΔVP, the valid period VP$_b$ registered in the storage device 13, to obtain "1" (see arrow H in FIG. 14, step S67).

The communication station 1$_a$ then judges whether the valid period VP$_b$ is equal to the reference value VP$_{REF}$ or more (step 368). Assuming that the reference value VP$_{REF}$ is previously set to "4", the communication station 1$_a$ is through with the data communication phase in FIG. 5 with the reason that the valid period VP$_b$ is "1", and the procedure goes to step S7.

Since the communication station 1$_a$ has already transmitted the communication reservation packet 103 for the required number of pieces, the procedure goes to step S8 so that the communication station 1$_a$ determines the transmission number M for the next unit packet frame. In this example, the transmission number M is presumably determined as "1".

Such sequence Seq15 to Seq18 forms the second unit packet frame PF$_2$.

In the third unit packet frame PF$_3$ and onwards, the communication station 1$_a$ operates in the same manner as in the unit packet frame PF$_2$ and transmits the communication reservation packet 103 to the communication station 1$_b$. However, as the communication station 1$_b$ has been waiting for new data to be transmitted since sequence Seq18$_1$, and thus neglects the communication reservation packet 103 even if the packet is addressed thereto.

Accordingly, every time the communication station 1$_a$ transmits the communication reservation packet 103 to the communication station 1$_b$, the communication station 1$_a$ goes to step S67 so as to shorten the valid period VP (see arrow I in FIG. 14). Consequently, the valid period VP of the communication station 1$_b$ will be soon equalized with the reference value VP$_{REF}$. When determined that the valid period VP of the communication station 1$_b$ is now equal to or more than the reference value VP$_{REF}$ in step S68, the communication station 1$_a$ deletes the set of transfer rate R$_b$, the identifier ID, the valid period VP$_b$, and the transmission frequency TF$_b$ from the storage device 13$_a$ in step S69. In this manner, the communication station 1$_a$ releases the bandwidth reserved for the communication station 1$_b$ (see arrow J in FIG. 14).

After the deletion, the communication station 1$_a$ does not transmit the communication reservation packet 103 to the communication station 1$_b$ unless the communication station 1$_a$ receive any new reservation request packet 102 therefrom.

As described in the foregoing, the communication station 1$_a$, operating as the receiving station 1$_R$ reserves a bandwidth for the communication station 1$_b$ as the transmitting station 1$_T$ in response to the reservation request packet 102. In addition, for the purpose of controlling the reserved bandwidth, the communication station 1$_a$ registers the identifier ID"b" of the communication station 1$_b$, the transfer rate R$_b$, the valid period VP$_b$, and the transmission frequency TF$_b$ as a set in the storage device 13$_a$. Herein, the valid period VP$_b$ is lengthened or shortened depending on the data packet 104 transmitted from the communication station 1$_T$. The communication station 1$_a$ voluntarily keeps transmitting, on the basis of the transmission frequency TF$_b$, the communication reservation packet 103 to the communication station 1$_b$ as long as the valid period thereof is valid, and reserving the bandwidth therefor.

In this manner, as shown in FIGS. 13 and 14, as long as the valid period VP is valid after the transmission of the reservation request packet 102 to the communication station 1$_a$, the communication station 1$_b$ can more swiftly transmit the data packet 104 by responding to the communication reservation packet 103 addressed thereto. As a result, in the communication system CS, the frequency of transmitting the reservation request packet 102 for bandwidth reservation is considerably reduced compared with the SRMA described in the Background Art. Accordingly, the overhead for the bandwidth reservation in this communication system CS is decreased, and thus bandwidths of the wireless transmission path 2 can be more effectively utilized.

Further, when it is assumed that any communication collision occurs on the wireless transmission path 2, the receiving station 1$_R$ relatively lowers the transmission probability value P of the request inquiry packet 101. In this manner, even if the transmitting station 1$_T$ has any data for transmission to the receiving station 1$_R$, the probability of transmission of the reservation request packet 102 is lowered. It means that the transmitting station $_1$, cannot transmit the reservation request packet 102 in some cases. As is known from this, the receiving station 1$_R$ perform traffic control of the wireless transmission path 2 according to the transmission probability value P so as to prevent the wireless transmission path 2 from being congested.

Also, if the transmitting station 1$_T$ transmits the data packet 104 less often, the valid period VP controlled on the receiving station 1$_R$ side accordingly becomes invalid rather soon and thus the bandwidth reserved for the transmitting station 1$_T$ is released. Accordingly, the bandwidths of the wireless transmission path 2 can be more effectively utilized.

Still further, in the communication system CS, the transmitting station 1$_T$ and the receiving station 1$_R$ can each obtain the partner's identifier ID for data communication before going through the data communication phase. Also, the transmitting station $_1T$ judges whether the communication reservation packet 103 is addressed thereto according to the first and second CRC values (see FIG. 12a or 12b), while the receiving station $1_R$ judges whether the data packet 104 is addressed thereto according to the first and second CRC values. In this manner, there is no more need to set the source identifier SID and the destination identifier DID to both the communication reservation packet 103 and the data packet 104. Accordingly, it becomes possible to make the packet length shorter, and thus the bandwidths of the wireless transmission path 2 can be more effectively utilized.

Although the wireless transmission path 2 interconnects the communication stations 1 in the communication system CS, a wired transmission path will do.

When it is known in step S38 in FIG. 6 that the predetermined time $T_{PRE1}$ is passed, the procedure goes to step S36. However, the lapse of predetermined time $T_{PRE1}$ is enough for the receiving station $1_R$ to make a judgement that the wireless transmission path 2 has no incoming signal. Therefore, at this point in time, the receiving station $1_R$ may transmit the communication reservation packet 103 to any one of the communication stations 1 for which a bandwidth is reserved.

Still further, in steps S141 and S146 in FIG. 10, if the transmitting station $1_T$ cannot correctly receive the communication reservation packet 103 and the data packet 104 addressed thereto, the procedure goes to steps S146 and S147. However, in steps S141 and S146, the transmitting station $1_T$ may receive the communication reservation packet 103 and the data packet 104 which are not addressed thereto. If this is the case, the possibility for the wireless transmission path 2 being congested is low, therefore the transmitting station $1_T$ may transmit the reservation request packet 102 to a certain communication station 1 when having any data for transmission thereto.

Still further, in this embodiment, the receiving station $1_R$ lengthens the valid period vP on reception of the data packet 104 from the transmitting station $1_T$ in step S65 in FIG. 7. However, the receiving station $1_R$ may transmit, to the transmitting station $1_T$, the communication reservation packet 103 which the transmitting station $1_T$ can transmit the data packet 104 with the length being relatively longer. In other words, the receiving station $1_R$ may dynamically change the transmission cycle of the communication reservation packet 103.

Still further, in the communication system CS, the receiving station $1_R$ controls reception of the data packet and assignment of bandwidths. However, one of the communication stations 1 may centrally control assignment of the bandwidths of the wireless transmission path 2, and other communication stations 1 may perform data communication therebetween.

Figure 15:
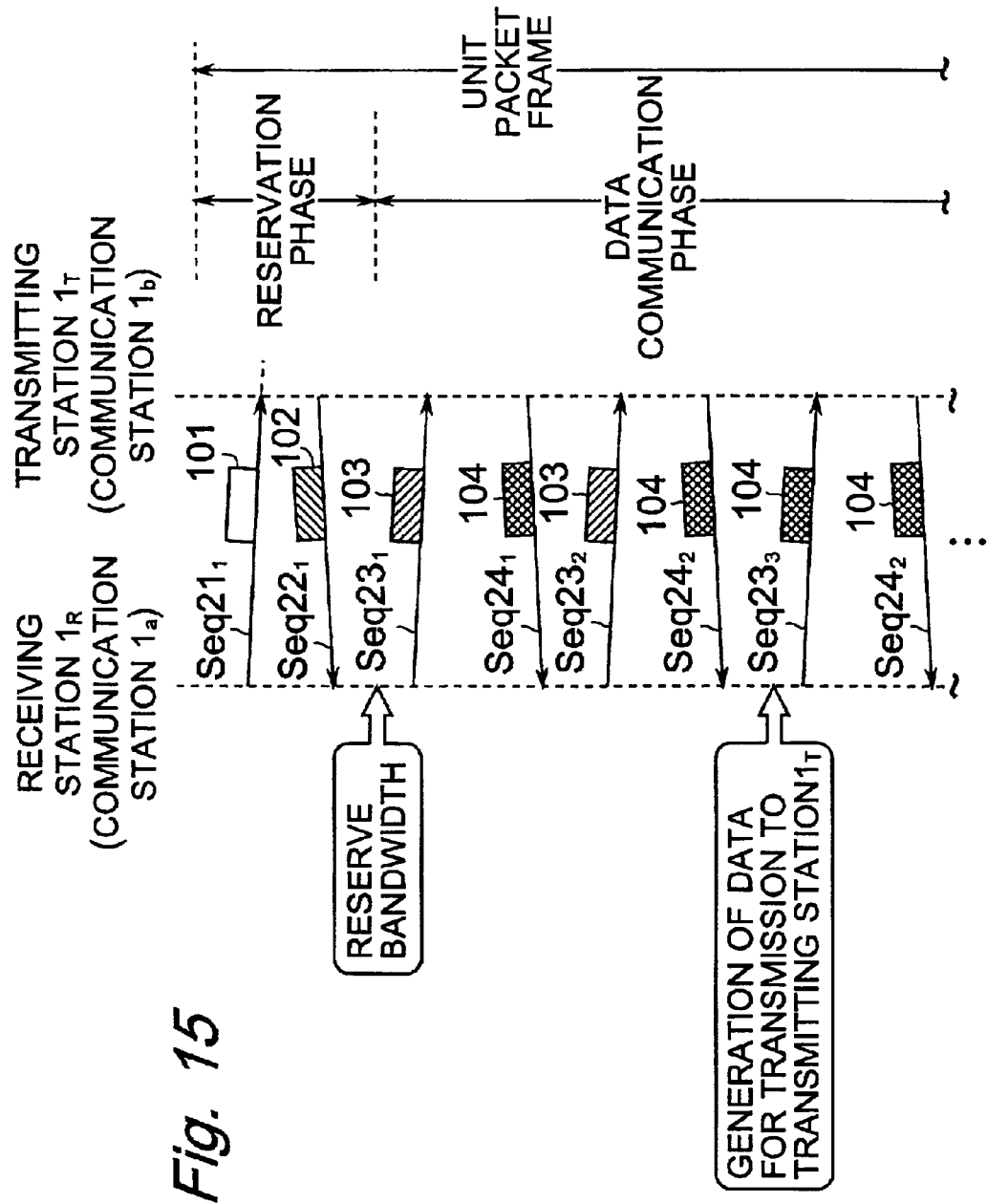
FIG. 15 is a sequence chart illustrating how data is exchanged between the transmitting station $1_T$ and the receiving station $1_R$.
Figure 16:
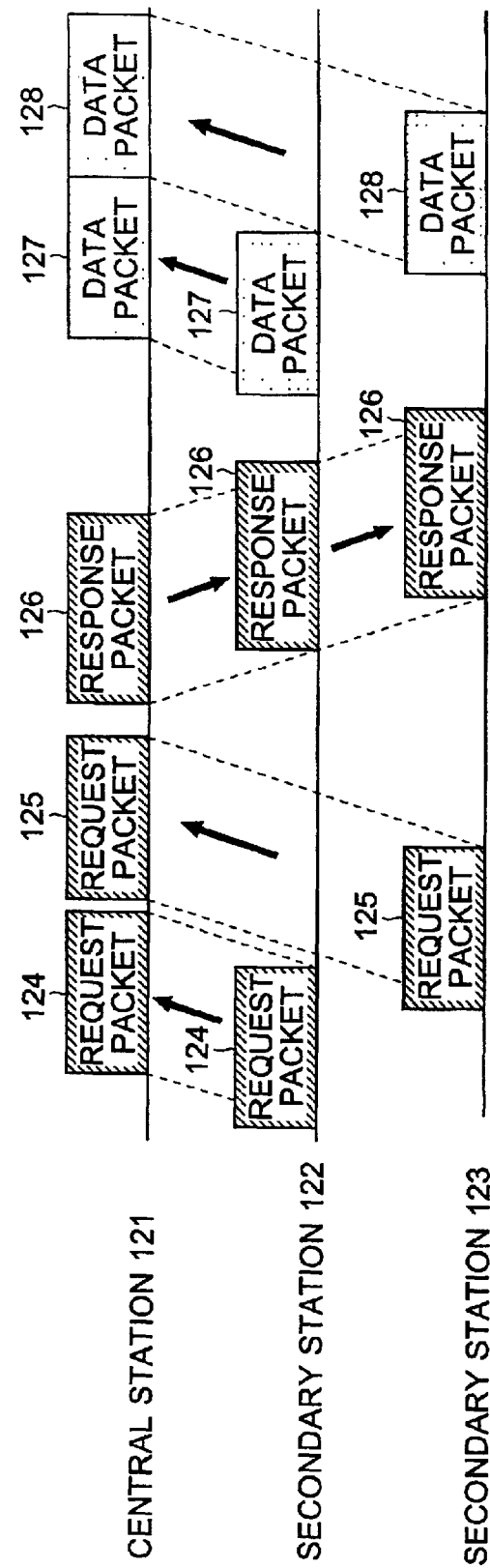
FIG. 16 is a diagram for illustrating a communication system to which SRMA is applied.

In the communication procedure in FIGS. 13 and 14, the case where the transmitting station $1_T$ transmit data to the receiving station $1_R$ is described. However, in the communication system CS, some data may be generated in the receiving station $1_R$ for transmission to the transmitting station $1_T$ while the transmitting station $1_T$ is transmitting data thereto. If this is the case, the transmitting station $1_T$ and the receiving station $1_R$ perform two-way data communication by using the communication procedure as shown in FIG. 15. Next below, similarly to the cases in FIGS. 13 and 14, the communication station $1_a$ presumably operates as the receiving station $1_R$, and the communication station $1_b$ as the transmitting station $1_T$.

The communication station $1_a$ transmits the request inquiry packet 101 in a similar manner to sequences $Seq11_1$ and $Seq11_2$ (FIG. 15; sequence $Seq21_1$), and receives the reservation request packet 102 from the transmitting station $1_b$ as a reply (sequence $Seq22_1$). The communication station $1_a$ disassembles the reservation request packet 102 and then reserves a bandwidth for the communication station $1_b$. Thereafter, the communication station $1_a$ transmits the communication reservation packet 103 to the communication station $1_b$ in a similar manner to the sequences $Seq13_1$ and $Seq13_2$ (FIG. 15; sequences Seq23, and $Seq23_2$). The communication station 1b assembles the data packet 104 in response to the communication reservation packet 103 as in sequences $Seq14_1$ and $Seq14_2$ for transmission to the communication station $1_a$ (sequences $Seq24_1$ and $Seq24_2$).

After receiving the data packet 104 transmitted in sequence $Seq24_2$, the communication station $1_a$ lengthens the valid period $VP_b$ of the communication station $1_b$ (FIG. 7; step S65). If the communication station $1_a$ does not yet transmit the communication reservation packet 103 for the required number of pieces, the procedure goes to step S6 in FIG. 5 (that is, step S61 in FIG. 7). Assuming that the identifier ID of the communication station $1_b$ is again selected (step S61), the communication station $1_a$ decides if having any data for transmission thereto (step S62). If any, the communication station $1_a$ assembles the data packet 104 for transmission thereto (sequence $Seq23_3$).

Thereafter, the communication station $1_a$ waits for the data packet 104 from the communication station $1_b$.

After transmitted the data packet 104 to the communication station $1_a$ in sequence $Seq24_2$, the communication station $1_b$ is again waiting for the communication reservation packet 103 addressed thereto (steps S141 and S147 in FIG. 10). Then, the communication station $1_b$ detects, receives, and disassembles the packet on the wireless transmission path 2 after sequence 233 so as to determine if the received packet is the communication reservation packet 103 (step S141). Since the communication station $1_b$ notices, over disassembly, that the packet type T included therein does not indicate the communication reservation packet 103, the procedure goes to step S146.

Thereafter, the communication station $1_b$ decides that the received packet is the data packet 104 with the help of packet type T, and then further disassembles the packet to extract the data block DB therefrom (step S146). The procedure then goes to step S143 and onwards, and accordingly the communication station $1_b$ assembles the data packet 104 for transmission to the communication station $1_a$ responding to the data packet 104 therefrom (step S143, sequence $Seq24_3$). From then and onward, the communication station 1, and $1_b$ exchange the data packet 104 therebetween.

While the invention has been described in detail, the foregoing description is in all aspects illustrative and not restrictive. It is understood that numerous othermodifications and variations can be devised without departing from the scope of the invention.

What is claimed is:

1. A communication system in which a transmitting station and a receiving station are communicably connected through a transmission path, and the receiving station reserves a bandwidth used in data communication for the transmitting station in advance, wherein said transmitting station transmits a reservation request packet for bandwidth reservation to said receiving station when data to be transmitted is generated, said receiving station reserves the bandwidth in response to the reservation request packet from said transmitting station, and transmits a communication reservation packet for informing said transmitting station of the reserved bandwidth, said transmitting station creates a data packet according to the generated data, and transmits the created data packet through the bandwidth informed by the communication reservation packet from said receiving station, said receiving station stores a valid period of the bandwidth reserved for said transmitting station, and voluntarily and repeatedly transmits the communication reservation packet to said transmitting station during the stored valid period, an initial value of the valid period stored for said transmitting station is predetermined, and said receiving station further
shortens the stored valid period with given timing,
lengthens the stored valid period on reception of the data packet from said transmitting station,
deletes the valid period when the valid period is equal to a predetermined reference value, and
voluntarily and repeatedly transmits the communication reservation packet to said transmitting station as long as the valid period is stored.

2. The communication system as claimed in claim 1, wherein said transmitting station further sets an identifier assigned thereto to the reservation request packet, and
said receiving station further
stores the identifier set to the reservation request packet transmitted from said transmitting station together with the initial value of the valid period, and
when deletes the valid period, deletes the stored identifier together therewith.

3. The communication system as claimed in claim 1, wherein said receiving station further changes a time interval between two communication reservation packets according to the valid period.

4. A communication system in which a transmitting station and a receiving station are communicably connected through a transmission path, and the receiving station reserves a bandwidth used in data communication for the transmitting station in advance, wherein
said transmitting station transmits a reservation request packet for bandwidth reservation to said receiving station when data to be transmitted is generated,
said receiving station reserves the bandwidth in response to the reservation request packet from said transmitting station, and transmits a communication reservation packet for informing said transmitting station of the reserved bandwidth,
said transmitting station creates a data packet according to the generated data and transmits the created data packet through the bandwidth informed by the communication reservation packet from said receiving station,
said receiving station stores a valid period of the bandwidth reserved for said transmitting station, and voluntarily and repeatedly transmits the communication reservation packet to said transmitting station during the stored valid period,
said receiving station further transmits, with given timing, a request inquiry packet for allowing said transmitting station to transmit the reservation request packet, and
said transmitting station further transmits the reservation request packet in response to the request inquiry packet transmitted from said receiving station.

5. The communication system as claimed in claim 4, wherein said receiving station further sets, to the request inquiry packet, a probability that said transmitting station can transmit the reservation request packet, and
said transmitting station further transmits the reservation request packet according to the probability value included in the request inquiry packet transmitted from said receiving station.

6. The communication system as claimed in claim 5, wherein, when said receiving station detected a communication collision on said transmission path, the probability value set to the request inquiry packet is relatively low.

7. The communication system as claimed in claim 5, wherein, when said receiving station correctly received the reservation request packet from said transmission path, the probability value set to the request inquiry packet is relatively high.

8. The communication system as claimed in claim 5, wherein, when no signal arrives the receiving station from said transmission path for a given time period, the probability set to the request inquiry packet is relatively high.

9. A communication system in which a transmitting station and a receiving station are communicably connected through a transmission path, and the receiving station reserves a bandwidth used in data communication for the transmitting station in advance, wherein
said transmitting station transmits a reservation request packet for bandwidth reservation to said receiving station when data to be transmitted is generated,
said receiving station reserves the bandwidth in response to the reservation request packet from said transmitting station, and transmits a communication reservation packet for informing said transmitting station of the reserved bandwidth,
said transmitting station creates a data packet according to the generated data, and transmits the created data packet through the bandwidth informed by the communication reservation packet from said receiving station,
said receiving station stores a valid period of the bandwidth reserved for said transmiting station, and voluntarily and repeatedly transmits the communication reservation packet to said transmitting station during the stored valid period, and
said receiving station further changes a time interval between two communication reservation packets according to a transfer rate required by said transmitting station.

10. A communication system in which a transmitting station and a receiving station are communicably connected through a transmission path, and the receiving station reserves a bandwidth used in data communication for the transmitting station in advance, wherein
said transmitting station transmits a reservation request packet for bandwidth reservation to said receiving station when data to be transmitted is generated,
said receiving station reserves the bandwidth in response to the reservation request packet from said transmitting station, and transmits a communication reservation packet for informing, said transmitting station of the reserved bandwidth,
said transmitting station creates a data packet according to the generated data, and transmits the created data packet through the bandwidth informed by the communication reservation packet from said receiving station, said receiving station stores a valid period of the bandwidth reserved for said transmitting station, and voluntarily and repeatedly transmits the communication reservation packet to said transmitting station during the stored valid period, and when no signal arrives the receiving station from said transmission path for a given time period, said receiving station further judges that the communication reservation packet can be transmitted.

11. A communication system in which a transmitting station and a receiving station are communicably connected through a transmission path, and the receiving station reserves a bandwidth used in data communication for the transmitting station in advance, wherein said transmitting station transmits a reservation request packet for bandwidth reservation to said receiving station when data to be transmitted is generated, said receiving station reserves the bandwidth in response to the reservation request packet from said transmitting station, and transmits a communication reservation packet for informing said transmitting station of the reserved bandwidth, said transmitting station creates a data packet according to the generated data, and transmits the created data packet through the bandwidth informed by the communication reservation packet from said receiving station, said receiving station stores a valid period of the bandwidth reserved for said transmitting station, and voluntarily and repeatedly transmits the communication reservation packet to said transmitting station during the stored valid period, and when no signal arrives the receiving station from said transmission path for a given time period, said transmitting station further judges that the reservation request packet can be transmitted.

12. A communication system in which a transmitting station and a receiving station are communicably connected through a transmission path, and the receiving station reserves a bandwidth used in data communication for the transmitting station in advance, wherein said transmitting station transmits a reservation request packet for bandwidth reservation to said receiving station when data to be transmitted is generated, said receiving station reserves the bandwidth in response to the reservation request packet from said transmitting station, and transmits a communication reservation packet for informing said transmitting station of the reserved bandwidth, said transmitting station creates a data packet according to the generated data, and transmits the created data packet through the bandwidth informed by the communication reservation packet from said receiving station, said receiving station stores a valid period of the bandwidth reserved for said transmitting station, and voluntarily and repeatedly transmits the communication reservation packet to said transmitting station during the stored valid period, and said transmitting station further measures a lapse of time after transmitted the data packet, and when the lapse oftime becomes equal to a reference value relevant to the valid period, judges that the reservation request packet can be transmitted.

13. A communication system in which a transmitting station and a receiving station are communicably connected through a transmission path, and the receiving station reserves a bandwidth used in data communication for the transmitting station in advance, wherein said transmitting station transmits a reservation reguest packet for bandwidth reservation to said receiving station when data to be transmitted is generated.

said receiving station reserves the bandwidth in response to the reservation request packet from said transmitting station, and transmits a communication reservation packet for informing said transmitting station of the reserved bandwidth, said transmitting station creates a data packet according to the generated data, and transmits the created data packet through the bandwidth informed by the communication reservation packet from said receiving station, said receiving station stores a valid period of the bandwidth reserved for said transmitting station, and voluntarily and repeatedly transmits the communication reservation packet to said tranmitting station during the stored valid period, and said transmitting station determines numbers of the communication reservation packets to be transmitted, and transmits the communication reservation packets according to the determined numbers.

* * * * *